US011295397B1

(12) United States Patent
Achlerkar et al.

(10) Patent No.: US 11,295,397 B1
(45) Date of Patent: Apr. 5, 2022

(54) SYSTEMS, METHODS, AND COMPUTER PROGRAM PRODUCTS FOR MATCHING SERVICE CONSUMERS AND PROVIDERS

(71) Applicant: INTUIT INC., Mountain View, CA (US)

(72) Inventors: Bhakti Achlerkar, Carrollton, TX (US); Jason P. Ridge, Frisco, TX (US); Brian Lewis, McKinney, TX (US); Robert Haley, Plano, TX (US); Tiago Schwartz Calheiros, Plano, TX (US); John Bradley Chaykowsky, Dallas, TX (US)

(73) Assignee: INTUIT INC., Mountain View, CA (US)

( * ) Notice: Subject to any disclaimer, the term of this patent is extended or adjusted under 35 U.S.C. 154(b) by 426 days.

(21) Appl. No.: 15/795,816

(22) Filed: Oct. 27, 2017

(51) Int. Cl.
*G06Q 40/00* (2012.01)
*G06Q 10/10* (2012.01)
*G06Q 30/02* (2012.01)

(52) U.S. Cl.
CPC ....... *G06Q 40/123* (2013.12); *G06Q 10/1095* (2013.01); *G06Q 30/0205* (2013.01); *G06Q 40/10* (2013.01); *G06Q 40/125* (2013.12)

(58) Field of Classification Search
CPC .. G06Q 40/00; G06Q 40/123; G06Q 10/1095; G06Q 30/0205; G06Q 40/10
See application file for complete search history.

(56) References Cited

U.S. PATENT DOCUMENTS

| | | | |
|---|---|---|---|
| 7,747,300 B1 | 6/2010 | de Barros | |
| 7,870,053 B1 | 1/2011 | Bergman | |
| 8,521,688 B1* | 8/2013 | Belwadi | G06Q 30/02 707/622 |
| 10,055,698 B2 | 8/2018 | Elenbaas | |
| 2001/0047347 A1 | 11/2001 | Perell | |
| 2005/0182743 A1 | 8/2005 | Koenig | |
| 2007/0214000 A1 | 9/2007 | Shahrabi | |

(Continued)

FOREIGN PATENT DOCUMENTS

WO     WO 2017/004104     1/2017

OTHER PUBLICATIONS

Seeing like a market M Fourcade, K Healy—Socio-economic review, 2017—academic.oup.com (Year: 2017).*

(Continued)

*Primary Examiner* — Lalita M Hamilton
(74) *Attorney, Agent, or Firm* — DLA Piper LLP (US)

(57) ABSTRACT

A system for matching a consumer of a service with a provider of the service includes a service consumer program host computer communicatively coupled to a consumer/provider matching computer through a first network. The system also includes a service provider host computer communicatively coupled to the consumer/provider matching computer through a second network. The system further includes a consumer computer communicatively coupled to the consumer/provider matching computer through a third network. Moreover, the system includes a provider computer communicatively coupled to the consumer/provider matching computer through a fourth network. The consumer/provider matching computer generates a ranked list of providers by analyzing consumer data.

46 Claims, 18 Drawing Sheets

(56) References Cited

U.S. PATENT DOCUMENTS

| | | |
|---|---|---|
| 2008/0303811 A1 | 12/2008 | Van Luchene |
| 2009/0112623 A1* | 4/2009 | Schoenberg .......... G06Q 10/02 |
| | | 705/2 |
| 2009/0204470 A1 | 8/2009 | Weyl |
| 2010/0069096 A1* | 3/2010 | Poola ..................... H04L 67/22 |
| | | 455/466 |
| 2011/0137730 A1* | 6/2011 | McCarney ......... G06Q 30/0203 |
| | | 705/14.58 |
| 2011/0184766 A1 | 7/2011 | Virdhagriswaran |
| 2012/0166310 A1 | 6/2012 | Werklund |
| 2012/0185410 A1 | 7/2012 | Hendrix |
| 2013/0013404 A1 | 1/2013 | Suprock |
| 2013/0096937 A1 | 4/2013 | Campbell |
| 2013/0297351 A1 | 11/2013 | Phillips |
| 2014/0040121 A1 | 2/2014 | Robb |
| 2014/0180715 A1 | 6/2014 | Phillips |
| 2014/0222702 A1 | 8/2014 | Jennings |
| 2014/0379520 A1 | 12/2014 | Nemery |
| 2015/0006422 A1 | 1/2015 | Carter |
| 2015/0066807 A1 | 3/2015 | Cohen |
| 2015/0100396 A1 | 4/2015 | Boury |
| 2016/0379173 A1 | 12/2016 | Karnati |
| 2017/0116384 A1 | 4/2017 | Ghani |
| 2017/0220966 A1 | 8/2017 | Wang |
| 2017/0371965 A1* | 12/2017 | Davar .................. G06F 16/951 |
| 2018/0012246 A1 | 1/2018 | Kamarei |
| 2018/0025309 A1 | 1/2018 | Absher |
| 2018/0060788 A1 | 3/2018 | Mase |
| 2018/0174106 A1 | 6/2018 | Kenthapadi |
| 2019/0052720 A1 | 2/2019 | Guo |

OTHER PUBLICATIONS

U.S. Appl. No. 15/795,716, filed Oct. 27, 2017.
U.S. Appl. No. 15/796,272, filed Oct. 27, 2017, Pending.
U.S. Appl. No. 15/795,716, filed Oct. 27, 2017, Pending.
U.S. Appl. No. 15/826,237, filed Nov. 29, 2017, Pending.
U.S. Appl. No. 15/796,272, filed Oct. 27, 2017.
U.S. Appl. No. 15/826,237, filed Nov. 29, 2017.
U.S. Appl. No. 15/796,272, filed Oct. 27, 2017 (Mar. 2, 2021—present).
U.S. Appl. No. 15/826,237, filed Nov. 29, 2017 (Mar. 2, 2021—present).
Partial File Wrapper History of U.S. Appl. No. 15/796,272, filed Oct. 27, 2017 (Sep. 1, 2021-present) captured from PAIR on Dec. 1, 2021.

* cited by examiner

Collaborate with your Accountant

We've invited the accountant to collaborate and help you.

Done

400K

| Chat with your accountant | |
|---|---|
| Me:<br>Hey there... | 09/30/2015 @ 5:57PM |
| Accountant C:<br>Hello, how can I help you? | 09/30/2015 @ 5:58PM |
| Accountant C:<br>I just sent you an estimate | 09/30/2015 @ 5:59PM |
| Me:<br>Great! I'll take a look | 09/30/2015 @ 6:00PM |
| *Type your message here...* | Send |

FIG. 8K

SYSTEMS, METHODS, AND COMPUTER PROGRAM PRODUCTS FOR MATCHING SERVICE CONSUMERS AND PROVIDERS

This application includes subject matter similar to the subject matter described in the following co-owned applications: (1) U.S. application Ser. No. 15/795,716, filed Oct. 27, 2017, entitled "SYSTEMS, METHODS, AND COMPUTER PROGRAM PRODUCTS FOR WEIGHING CRITERIA FOR SERVICE CONSUMER AND PROVIDER MATCHING"; and (2) U.S. application Ser. No. 15/796,272, filed Oct. 27, 2017, entitled "CROWDSOURCE-BASED ONLINE APPLICATION MANAGEMENT." The contents of the above-mentioned applications are fully incorporated herein by reference as though set forth in full.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

SUMMARY

Embodiments are directed to systems, computer-implemented methods, and computer program products for matching service consumers and providers.

In one embodiment, a system for matching a consumer of a service with a provider of the service includes a service consumer program host computer communicatively coupled to a consumer/provider matching computer through a first network. The system also includes a service provider program host computer communicatively coupled to the consumer/provider matching computer through a second network. When the service consumer program host computer receives a service provider match request, the service consumer program host computer sends consumer data corresponding to the consumer to the consumer/provider matching computer through the first network. The consumer/provider matching computer identifies a first plurality of providers, each of the first plurality of providers meeting at least one of a plurality of criteria derived from the consumer data. The consumer/provider matching computer also ranks the first plurality of providers based on one or more criteria from the plurality of criteria met by each provider of the first plurality of providers to generate a ranked first plurality of providers. Moreover, the consumer/provider matching computer identifies a second plurality of providers, each of the second plurality of providers meeting none of the plurality of criteria derived from the consumer data. In addition, the consumer/provider matching computer ranks the second plurality of providers based on respective geographical distances from the consumer and respective customer ratings to generate a ranked second plurality of providers. The consumer/provider matching computer also appends the ranked second plurality of providers to an end of the ranked first plurality of providers to generate a ranked list of providers. The consumer/provider matching computer further sends the ranked list of providers to the service consumer program host computer through the first network.

In one or more embodiments, the consumer/provider matching computer derives the plurality of criteria from the consumer data by aggregating criteria from a pre-determined list of criteria present in the consumer data. The consumer/provider matching computer may rank the first plurality of providers by assigning respective numerical values to each criterion of the one or more criteria met by each provider of the first plurality of providers, and summing the respective numerical values for the one or more criteria met by each provider of the first plurality of providers. The service provider program host computer may rank the first plurality of providers by modifying a numerical value assigned to a criterion from the one or more criteria met by a provider by multiplying the numerical value by a pre-determined modifier value before summing the respective numerical values for the one or more criteria met by each provider of the first plurality of providers. Each of the respective numerical values may be equal to the others. The consumer/provider matching computer may assign different numerical values to at least two of the one or more criteria met by each provider of the first plurality of providers.

In one or more embodiments, the consumer/provider matching computer ranks the second plurality of providers by assigning respective distance values to the respective geographical distances from the consumer of each provider of the second plurality of providers, assigning respective rating values to the respective customer ratings of each provider of the second plurality of providers, and summing the respective distance values and ranking values for each provider of the second plurality of providers. The consumer/provider matching computer may assign the respective distance values by multiplying the respective geographical distances from the consumer of each provider of the second plurality of providers by a pre-determined distance modifier value. The consumer/provider matching computer assigns the respective ranking values by averaging the respective customer ratings of each provider of the second plurality of providers and multiplying by a pre-determined rating modifier value.

In one or more embodiments, the service provider program host computer sends provider data corresponding to a plurality of providers to the consumer/provider matching computer, the plurality of providers including the first and second pluralities of providers. The consumer/provider matching computer may identify the first plurality of providers by testing the providing data corresponding to each of the plurality of providers against corresponding criteria of the plurality of criteria derived from the consumer data.

In one or more embodiments, the plurality of criteria includes an industry corresponding to the consumer. The respective customer ratings may include customer ratings generated using a reverse ranking system.

In one or more embodiments, the service is an accounting service, the consumer is a taxpayer, and the provider is an accountant. The plurality of criteria may include a legal entity status or an industry corresponding to the taxpayer. The consumer/provider matching computer may also analyze a financial record of the taxpayer to determine a criterion from the plurality of criteria. The criterion may correspond to a frequency of data entry into the financial record, an internal accuracy of data in the financial record, the taxpayer's use of the accounting software, a history of the taxpayer's use of the accounting software, a number of employees, a number of transactions, a number of customers, a number of vendors, an income amount, profit and loss data, a location of an employee, a location of a customer, a location of a vendor, and a degree of organization of the financial record. The criterion may indicate extra work related to a tax return of the taxpayer.

In one or more embodiments, the system also includes transmitting, by the service consumer program host computer, the ranked list of providers to a consumer computer through a third network. The system also includes receiving, by the service consumer program host computer, a selection of a provider from the ranked list of providers via one or more of the first network and the third network. The system further includes generating, by the service consumer program host computer, a prospect for the provider relating to the consumer. Moreover, the system includes transmitting, by the service consumer program host computer, a notification regarding the prospect to a provider computer through a second network. In addition, the system includes facilitating, by the service consumer program host computer, communication between the consumer and the provider.

In one or more embodiments, the consumer computer displays the ranked list of providers to the consumers by serially displaying one or more providers based on a ranking on the ranked list. The consumer/provider matching computer may facilitate communication between the consumer and the provider by sending consumer contact information to the provider, sending provider contact information to the consumer, scheduling an in-person meeting, scheduling a virtual meeting, or initiating an online chat. The notification regarding the prospect may include contact information for the consumer.

In one or more embodiments, the provider computer displays a user interface of a service provider program running on the service provider program host computer to the provider, the user interface including a list of prospects including the prospect, and receives through the user interface of the service provider program a provider selection of the prospect from the list of prospects before facilitating communication between the consumer and the provider. The consumer/provider matching computer may update the ranked list of providers when the consumer/provider matching computer receives a subsequent service provider match request.

In another embodiment, a computer-implemented method for matching a consumer of a service with a provider of the service includes a service consumer program host computer receiving a service provider match request. The method also includes the service consumer program host computer sending consumer data corresponding to the consumer to a consumer/provider matching computer through a first network in response to receiving the service provider match request. The method further includes the consumer/provider matching computer identifying a first plurality of providers, each of the first plurality of providers meeting at least one of a plurality of criteria derived from the consumer data. Moreover, the method includes the consumer/provider matching computer ranking the first plurality of providers based on one or more criteria from the plurality of criteria met by each provider of the first plurality of providers to generate a ranked first plurality of providers. In addition, the method includes the consumer/provider matching computer identifying a second plurality of providers, each of the second plurality of providers meeting none of the plurality of criteria derived from the consumer data. The method also includes the consumer/provider matching computer ranking the second plurality of providers based on respective geographical distances from the service consumer and respective customer ratings to generate a ranked second plurality of providers. The method further includes the consumer/provider matching computer appending the ranked second plurality of providers to an end of the ranked first plurality of providers to generate a ranked list of providers. Moreover, the method includes the consumer/provider matching computer sending the ranked list of providers to the service consumer program host computer through the first network.

In one or more embodiments, the method also includes the consumer/provider matching computer deriving the plurality of criteria from the consumer data by aggregating criteria from a pre-determined list of criteria present in the consumer data. The method may further include the consumer/provider matching computer assigning respective numerical values to each criterion of the one or more criteria met by each provider of the first plurality of providers. Moreover, the method may include the consumer/provider matching computer summing the respective numerical values for the one or more criteria met by each provider of the first plurality of providers to rank the first plurality of providers. The consumer/provider matching computer may modify a numerical value assigned to a criterion from the one or more criteria met by a provider by multiplying the numerical value by a pre-determined modifier value before summing the respective numerical values for the one or more criteria met by each provider of the first plurality of providers. Each of the respective numerical values may be equal to the others. The method may include the consumer/provider matching computer assigning different numerical values to at least two of the one or more criteria met by each provider of the first plurality of providers.

In one or more embodiments, the method also includes the consumer/provider matching computer assigning respective distance values to the respective geographical distances from the consumer of each provider of the second plurality of providers. The method may further include the consumer/provider matching computer assigning respective rating values to the respective customer ratings of each provider of the second plurality of providers. Moreover, the method may include the consumer/provider matching computer summing the respective distance values and ranking values for each provider of the second plurality of providers to rank the second plurality of provider. The method may also include the consumer/provider matching computer multiplying the respective geographical distances from the consumer of each provider of the second plurality of providers by a pre-determined distance modifier value to assign the respective distance values. The method may also include the consumer/provider matching computer averaging the respective customer ratings of each provider of the second plurality of providers and multiplying by a pre-determined rating modifier value to assign the respective ranking values.

In one or more embodiments, the method also includes the service provider program host computer sending provider data corresponding to a plurality of providers to the consumer/provider matching computer, the plurality of providers including the first and second pluralities of providers. The method may also include the consumer/provider matching computer identifying the first plurality of providers by testing the providing data corresponding to each of the plurality of providers against corresponding criteria of the plurality of criteria derived from the consumer data.

In one or more embodiments, the plurality of criteria includes an industry corresponding to the consumer. The respective customer ratings may include customer ratings generated using a reverse ranking system.

In one or more embodiments, the service is an accounting service, the consumer is a taxpayer, and the provider is an accountant. The plurality of criteria may include a legal entity status or an industry corresponding to the taxpayer. The method may also include the consumer/provider matching computer analyzing a financial record of the taxpayer to determine a criterion from the plurality of criteria. The criterion may correspond to a frequency of data entry into the financial record, an internal accuracy of data in the financial record, the taxpayer's use of the accounting software, a history of the taxpayer's use of the accounting software, a number of employees, a number of transactions, a number of customers, a number of vendors, an income amount, profit and loss data, a location of an employee, a location of a customer, a location of a vendor, and a degree of organization of the financial record. The criterion may indicate extra work related to a tax return of the taxpayer.

In one or more embodiments, the method also includes the service consumer program host computer transmitting the ranked list of providers to a consumer computer through a third network. The method further includes the service consumer program host computer receiving a selection of a provider from the ranked list of providers via one or more of the first network and the third network. Moreover, the method includes the service consumer program host computer generating a prospect for the provider relating to the consumer. In addition, the method includes the service consumer program host computer transmitting a notification regarding the prospect to a provider computer through a second network. The method also includes the service consumer program host computer facilitating communication between the consumer and the provider.

In one or more embodiments, the consumer computer displays the ranked list of providers to the consumers by serially displaying one or more providers based on a ranking on the ranked list. The consumer/provider matching computer may facilitate communication between the consumer and the provider by sending consumer contact information to the provider, sending provider contact information to the consumer, scheduling an in-person meeting, scheduling a virtual meeting, or initiating an online chat. The notification regarding the prospect may include contact information for the consumer.

In one or more embodiments, the method also includes the provider computer displaying a user interface of a service provider program running on the service provider program host computer to the provider, the user interface including a list of prospects including the prospect, and receiving through the user interface of the service provider program a provider selection of the prospect from the list of prospects before facilitating communication between the consumer and the provider. The method may also include the consumer/provider matching computer updating the ranked list of providers when the consumer/provider matching computer receives a subsequent service provider match request.

In still another embodiment, a system, includes a processor; and memory having instructions stored thereon which, when executed by the processor, performs an operation for matching a consumer of a service with a provider of the service. The operation includes receiving a service provider match request from a consumer and consumer data corresponding to the consumer. The operation also includes identifying a first plurality of providers, each of the first plurality of providers meeting at least one of a plurality of criteria derived from the consumer data. The operation further includes ranking the first plurality of providers based on one or more criteria from the plurality of criteria met by each provider of the first plurality of providers to generate a ranked first plurality of providers. Moreover, the operation includes identifying a second plurality of providers, each of the second plurality of providers meeting none of the plurality of criteria derived from the consumer data. In addition, the operation includes ranking the second plurality of providers based on respective geographical distances from the consumer and respective customer ratings to generate a ranked second plurality of providers. The operation also includes appending the ranked second plurality of providers to an end of the ranked first plurality of providers to generate a ranked list of providers. The operation further includes sending the ranked list of providers to the consumer.

In one or more embodiments, the operation also includes deriving the plurality of criteria from the consumer data by aggregating criteria from a pre-determined list of criteria present in the consumer data. The operation may also include assigning respective numerical values to each criterion of the one or more criteria met by each provider of the first plurality of providers, and summing the respective numerical values for the one or more criteria met by each provider of the first plurality of providers to rank the first plurality of providers. The operation may also include modifying a numerical value assigned to a criterion from the one or more criteria met by a provider by multiplying the numerical value by a pre-determined modifier value before summing the respective numerical values for the one or more criteria met by each provider of the first plurality of providers. Each of the respective numerical values may be equal to the others. The operation may also include assigning different numerical values to at least two of the one or more criteria met by each provider of the first plurality of providers.

In one or more embodiments, the operation also includes assigning respective distance values to the respective geographical distances from the consumer of each provider of the second plurality of providers, assigning respective rating values to the respective customer ratings of each provider of the second plurality of providers, and summing the respective distance values and ranking values for each provider of the second plurality of providers to rank the second plurality of provider. The operation may also include multiplying the respective geographical distances from the consumer of each provider of the second plurality of providers by a pre-determined distance modifier value to assign the respective distance values. The operation may also include averaging the respective customer ratings of each provider of the second plurality of providers and multiplying by a pre-determined rating modifier value to assign the respective ranking values.

In one or more embodiments, the operation also includes receiving provider data corresponding to a plurality of providers, the plurality of providers including the first and second pluralities of providers. The operation may also include identifying the first plurality of providers by testing the providing data corresponding to each of the plurality of providers against corresponding criteria of the plurality of criteria derived from the consumer data.

In one or more embodiments, the plurality of criteria includes an industry corresponding to the consumer. The respective customer ratings may include customer ratings generated using a reverse ranking system.

In one or more embodiments, the service is an accounting service, the consumer is a taxpayer, and the provider is an accountant. The plurality of criteria may include a legal entity status or an industry corresponding to the taxpayer. The operation may also include analyzing a financial record of the taxpayer to determine a criterion from the plurality of criteria. The criterion may correspond to a frequency of data entry into the financial record, an internal accuracy of data in the financial record, the taxpayer's use of the accounting software, a history of the taxpayer's use of the accounting software, a number of employees, a number of transactions, a number of customers, a number of vendors, an income amount, profit and loss data, a location of an employee, a location of a customer, a location of a vendor, and a degree of organization of the financial record. The criterion may indicate extra work related to a tax return of the taxpayer.

In one or more embodiments, the operation also includes generating a prospect for the provider relating to for the consumer, sending a notification regarding the prospect to a provider, and facilitating communication between the consumer and the provider. The operation may also include facilitating communication between the consumer and the provider by sending consumer contact information to the provider, sending provider contact information to the consumer, scheduling an in-person meeting, scheduling a virtual meeting, or initiating an online chat. The notification regarding the prospect may include contact information for the consumer. The operation may also include updating the ranked list of providers when the consumer/provider matching computer receives a subsequent service provider match request.

In yet another embodiment, a data structure for use in a taxpayer/accountant matching system includes an identifier corresponding to an accountant, the accountant's name, an industry code corresponding to an industry supported by the accountant, a list of customer ratings for the accountant, an average review rating for the accountant, GPS coordinates corresponding to a location of the accountant, a state code corresponding to a state supported by the accountant, a photograph of the accountant, a text comment from the accountant, a certification of the accountant, and an identifier corresponding to a firm of the accountant.

In another embodiment, a data structure for use in a taxpayer/accountant matching system includes an identifier corresponding to a prospect, the prospect's name, the prospect's phone number, and the prospect's email address.

BRIEF DESCRIPTION OF THE DRAWINGS

The foregoing and other aspects of embodiments are described in further detail with reference to the accompanying drawings, in which the same elements in different figures are referred to by common reference numerals, wherein:

FIGS. 8A-8K depict a series of user interfaces corresponding to the computer-implemented method/algorithm/rule set depicted in FIGS. 6 and 7 according to one embodiment.

Figure 1:
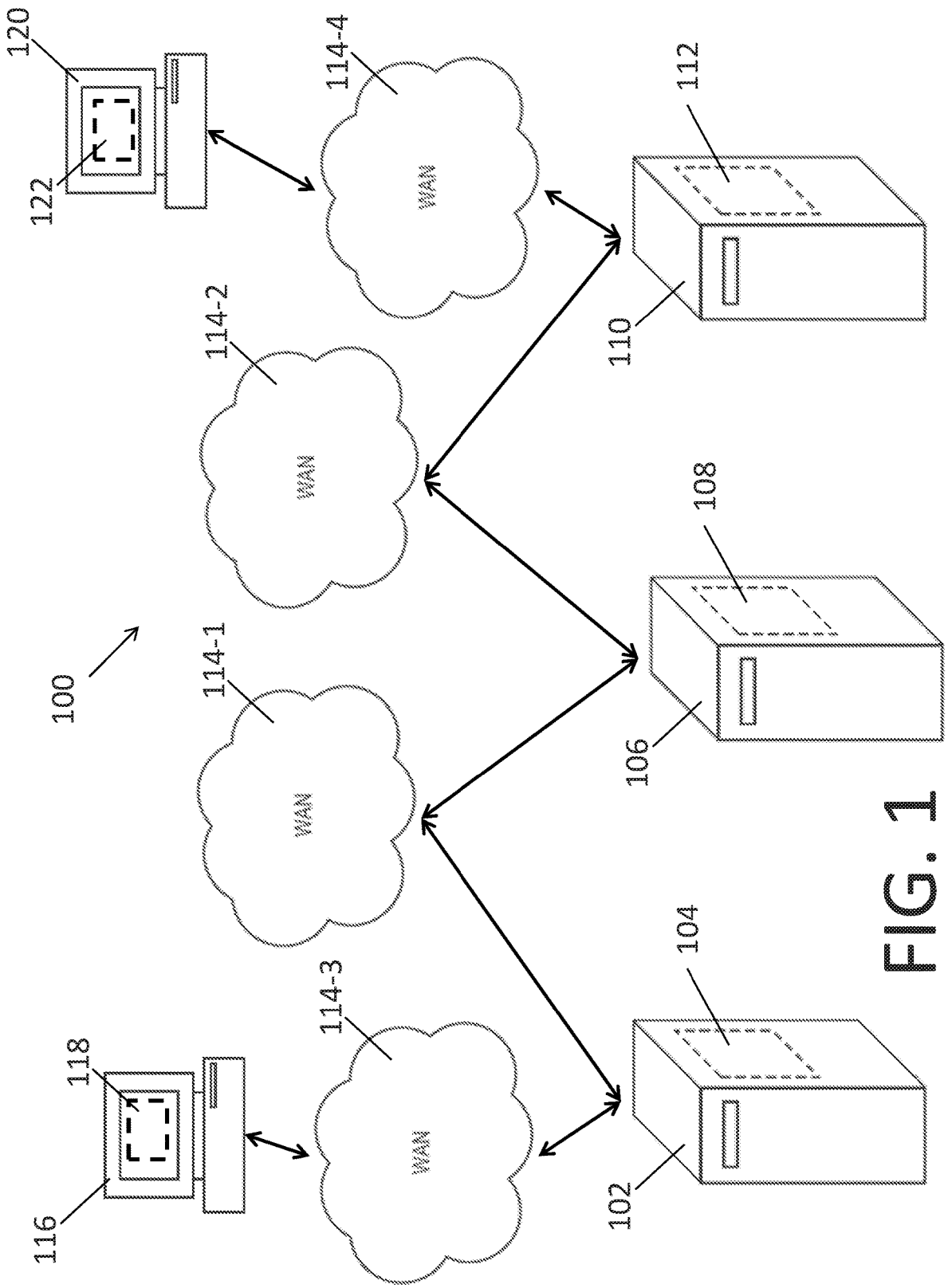
FIGS. 1 to 4 are schematic diagrams illustrating the implementation of service consumer/provider matching systems on computing devices according to various embodiments.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

Consumers of services vary greatly even when they are consumers of a particular service. For instance, consumers of a particular service may vary along various axes such as business size, location, and industry. Similarly, providers of services vary greatly even when they are providers of a particular service. For instance, providers of a particular service may vary along various axes such as areas of expertise within a particular service field, location, and ability/licensure to practice in a particular jurisdiction. Technical problems in matching service consumers and providers include the processing cycles, memory, and communication bandwidth required to match service consumers and providers along a variety of axes, and difficulty achieving an accurate service consumer/provider match given the wide variety of factors to be considered. These technical problems are exacerbated by the increasing amount of data available for individuals, including service consumers and providers, in the "big data" environment. The technical problems are also exacerbated by systems that match large numbers of service consumers to large numbers of service providers. Because service consumer/provider systems typically match large numbers of consumers and provides, this technical problem can degrade the effectiveness of such service consumer and provider matching systems. Overcoming these technical problems allows the consumers and providers to more efficiently, rapidly, accurately/successfully, and usably procure and furnish the services, respectively. This will save service consumers and providers time, effort and money while helping them to accomplish their tasks more efficiently, rapidly, accurately/successfully, and usably with better results. As used in this application, a "matching" service consumers and providers includes, but is not limited to, identifying a provider who will be able to efficiently, rapidly, accurately/successfully, and usably furnish a service to a consumer and/or identifying a consumer for whom a provider will be able to efficiently, rapidly, and accurately/successfully, and usably furnish a service.

The embodiments described herein include an automated service consumer/provider matching system. The system derives a set of criteria from consumer data and uses those criteria to rank a list of service providers according to their "fit" with the consumer. The system then presents the ranked list of service providers to the consumer for selection of a provider, and facilitates communication between the consumer and the selected provider. As used in this application, a "fit" between service consumers and providers includes, but is not limited to, a degree to which a provider will be able to efficiently, rapidly, accurately/successfully, and usably furnish a service to a consumer.

In one embodiment, a consumer/provider matching computer hosts a consumer/provider matching service and is communicatively coupled to a consumer computer through a first network. The consumer/provider matching computer is also communicatively coupled to a provider computer through a second work. When a consumer requests a service provider match using the consumer computer, the consumer/provider matching computer receives consumer data that is specific to the consumer. The consumer/provider matching computer then generates a ranked list of providers that are ordered according to a predicted fit with the consumer based on the consumer data. The consumer/provider matching computer sends the ranked list of providers to the consumer computer, which displays the ranked list of providers to the consumer and receives a selection of a provider from the ranked list by the consumer. The consumer/provider matching computer then generates a prospect for the selected provider including contact information for the consumer, and sends a notification regarding the prospect to the selected provider. The consumer/provider matching computer then facilitates communication between the consumer and the selected provider.

In some embodiments, the service is accounting services, the consumer is a taxpayer, and the provider is an accountant. In some such embodiments, the consumer/provider matching computer compares matches accountants to taxpayers by applying the following rules. First, the consumer/provider matching computer derives a set of criteria from data about the taxpayer (i.e., taxpayer date). These criteria may include an industry, a legal entity status, a location, a frequency of data entry into the financial record, an internal accuracy of data in the financial record, the taxpayer's use of the accounting software, a history of the taxpayer's use of the accounting software, a number of employees, a number of transactions, a number of customers, a number of vendors, an income amount, profit and loss data, a location of an employee, a location of a customer, a location of a vendor, and/or a degree of organization of the financial record. Then, the consumer/provider matching computer analyzes accountant data for each of a plurality of accountants (e.g., all accountants participating in an accountant matching service) to identify the criteria matched by each accountant. Next, the consumer/provider matching computer generates a first list of accountants that each matches at least one criterion, and ranks these accountants by the number of criteria matched. In one embodiment, the criteria can be weighed differently during the ranking. For instance, an accountant matching an industry (i.e., expertise therein) may receive two points, but an accountant matching a legal entity status may receive only one point toward ranking. Then, the consumer/provider matching computer generates a second list of accountants that do not match any of the criteria, and ranks these accountants by their distance to the taxpayer and their average customer reviews. In one embodiment, the distance may be worth negative one point per mile and the review may be worth one point per star out of five. Next the consumer/provider matching computer appends the second list of accountants to the end of the first list to generate a ranked list of accountants, which is presented to the taxpayer. The ranked list may be presented to the taxpayer three accountants at a time through a user interface of the taxpayer's online accounting program. The consumer/provider matching computer received a taxpayer selection of an accountant, and facilitates a connection/communications between the taxpayer and the selected accountant.

Using referrals from acquaintances in the field of the service can result in mismatches of service consumers and providers, which can lead to wasted time, effort, and money informing a service consumer/provider relationship. Although acquaintances may attempt to provide accurate information, anecdotal evidence can leads to inaccurate matches, resulting in an unusable matching system. Similarly, reading reviews of service providers to match a service provider to a customer is often time-consuming and in accurate. This problem is exacerbated by the proliferation of professional review writers and the fake reviews that they offer for sale. In automated or semi-automated systems, this lack of accuracy results in wasted processor cycles, memory, and communication bandwidth, which are exacerbated by increasing numbers of service consumers and providers, as described above. On the other hand, the automated service consumer/provider matching systems disclosed herein apply rules for analysis of provider data in view of consumer data specific to the consumer identify and rank providers that match the consumer's needs. Consequently, the automated service consumer/provider matching systems increase the speed, accuracy, and usability of consumer/provider matching systems.

As used in this application, a "consumer" includes, but is not limited to, a person or entity attempting to procure a service. As used in this application, a "provider" includes, but is not limited to, a person or entity offering to furnish/perform a service. As used in this application, "consumer data" includes, but is not limited to, information relating to a consumer. As used in this application, "provider data" includes, but is not limited to, information relating to a provider.

As used in this application, a "taxpayer" includes, but is not limited to, a person or entity preparing a tax. The "taxpayer" may or may not be obligated to file the tax return. As used in this application, "taxpayer data" includes, but is not limited to, information relating to a taxpayer, including, but not limited to, information that may affect the taxpayer's tax burden and information typically included in a tax return. As used in this application, "accountant data" includes, but is not limited to, information relating to an accountant.

As used in this application, a "financial management system" includes, but is not limited to, software that oversees and governs an entity's (e.g., person, business entity, government) finances (e.g., income, expenses, assets, and liabilities). Exemplary financial management system include MINT Financial Management Software, QUICKBOOKS, QUICKBOOKS FOR ACCOUNTANTS, TURBOTAX, which are available from Intuit Inc. of Mountain View, Calif., MICROSOFT DYNAMICS GP, which is available from Microsoft Corp. of Redmond, Wash., and YODLEE Financial Management Software, which is available from Yodlee, Inc. of Redwood City, Calif. A financial management system is executed to assist a user with managing its finances. As part of overseeing and governing an entity's finances, financial management systems may access financial transaction data stored in various user accounts including checking, savings, money market, credit card, stock, loan, mortgage, payroll or other types of user account. Such user accounts can be hosted at a financial institution such as a bank, a credit union, a loan services or a brokerage. Financial transaction data may include, for example, account balances, transactions (e.g., deposits, withdraws, and bill payments), debits, credit card transactions (e.g., for merchant purchases). Financial management systems can also obtain financial transaction data directly from a merchant computer or a point of sale terminal. Financial management systems can include financial transaction data aggregators that manage and organize financial transaction data from disparate sources. While certain embodiments are described with reference to MINT Financial Management Software, the embodiments described herein can include other financial management systems such as QUICKRECIPTS Financial Management Software, FINANCEWORKS Financial Management Software, MICROSOFT DYNAMICS GP, YODLEE Financial Management Software (available from Yodlee, Inc. of Redwood City, Calif.) and other financial management systems capable of providing a taxpayer's financial data to an electronic tax return preparation system.

As used in this application, "accounting software" includes, but is not limited to, software that handles and stores an entity's (e.g. person, business entity, government) accounting transactions (e.g., debits, credits, investments, loans). Exemplary accounting software include MINT Financial Management Software, QUICKBOOKS, QUICK-BOOKS FOR ACCOUNTANTS, which are available from Intuit Inc. of Mountain View, Calif.

As used in this application, "computer," "computer device," or "computing device" includes, but are not limited to, a computer (laptop or desktop) and a computer or computing device of a mobile communication device, smartphone and tablet computing device.

As used in this application, "consumer/provider matching system," "consumer/provider matching computing device," "consumer/provider matching computer," "consumer/provider matching software," "consumer/provider matching module," "consumer/provider matching application," or "consumer/provider matching program" include, but are not limited to, one or more separate and independent software and/or hardware components of a computer that must be added to a general purpose computer before the computer can match consumers and providers based on consumer data, and computers having such components added thereto.

As used in this application, "server" or "server computer" includes, but is not limited to, one or more separate and independent software and/or hardware components of a computer that must be added to a general purpose computer before the computer can receive and respond to requests from other computers and software in order to share data, hardware, and/or software resources among the other computers and software, and computers having such components added thereto. As used in this application, "obtaining data" or "acquiring data" includes, but is not limited to, accessing data (e.g., from a database through a network) and generating data (e.g., using one or more hardware and software components).

As used in this application, "input/output module" or "input output module" includes, but is not limited to, one or more separate and independent software and/or hardware components of a computer that must be added to a general purpose computer before the computer can communicate with and facilitate the receipt and transfer of information, including consumer data, provider data, taxpayer data, and accountant data, from and to other computers. As used in this application, "memory module" includes, but is not limited to, one or more separate and independent software and/or hardware components of a computer that must be added to a general purpose computer before the computer can store information, including consumer data, provider data, taxpayer data, and accountant data. As used in this application, a "user interface controller" includes, but is not limited to, one or more separate and independent software and/or hardware components of a computer that must be added to a general purpose computer before the computer can receive information from and send information to a user. As used in this application, "application programming interface" and/or "API" includes, but is not limited to, one or more separate and independent software and/or hardware components of a computer that must be added to a general purpose computer before the computer can receive information from and send programming instructions to a separate computer.

As used in this application, "website" includes, but is not limited to, one or more operatively coupled webpages. As used in this application, "browser" or "web browser" includes, but is not limited to, one or more separate and independent software and/or hardware components of a computer that must be added to a general purpose computer before the computer can receive, display and transmit resources from/to the World Wide Web.

FIG. 1 depicts an exemplary service consumer/provider matching system 100 according to one embodiment in which a service consumer/provider matching program 108 can operate. The system 100 according to this embodiment includes a consumer/provider matching computer 106, which hosts the consumer/provider matching program 108. The consumer/provider matching computer 106 may be a server. The system 100 also includes a service consumer program host computer/server 102, which hosts the service consumer program 104. The system 100 further includes a service provider program host computer/server 110, which hosts the service provider program 112. Moreover, the system 100 includes a consumer computer 116 and a provider computer 120, both of which host respective browsers 118, 122.

As shown in FIG. 1, the consumer/provider matching computer 106 is communicatively coupled to the service consumer program host computer 102 and the service provider program host computer 110 through respective first and second networks 114-1, 114-2. The service consumer program host computer 102 is also communicatively coupled to the consumer computer 116 through a third network 114-3. The service provider program host computer 110 is also communicatively coupled to the provider computer 122 through a fourth network 114-4. Although four networks 114-1, 114-2, 114-3, 114-4 are depicted in FIG. 1, the various computer components of the service consumer/provider matching system 100 (i.e., consumer/provider matching computer 106, service consumer and provider program host computers 106, 110, and consumer and provider computers 116, 120) may be communicatively coupled to each other by more or fewer networks. For instance, in the service consumer/provider matching system 100' according to another embodiment shown in FIG. 2, the consumer/provider matching computer 106, service consumer and provider program host computers 106, 110, and consumer and provider computers 116, 120 are communicatively coupled to each other through one network 114.

Figure 2:
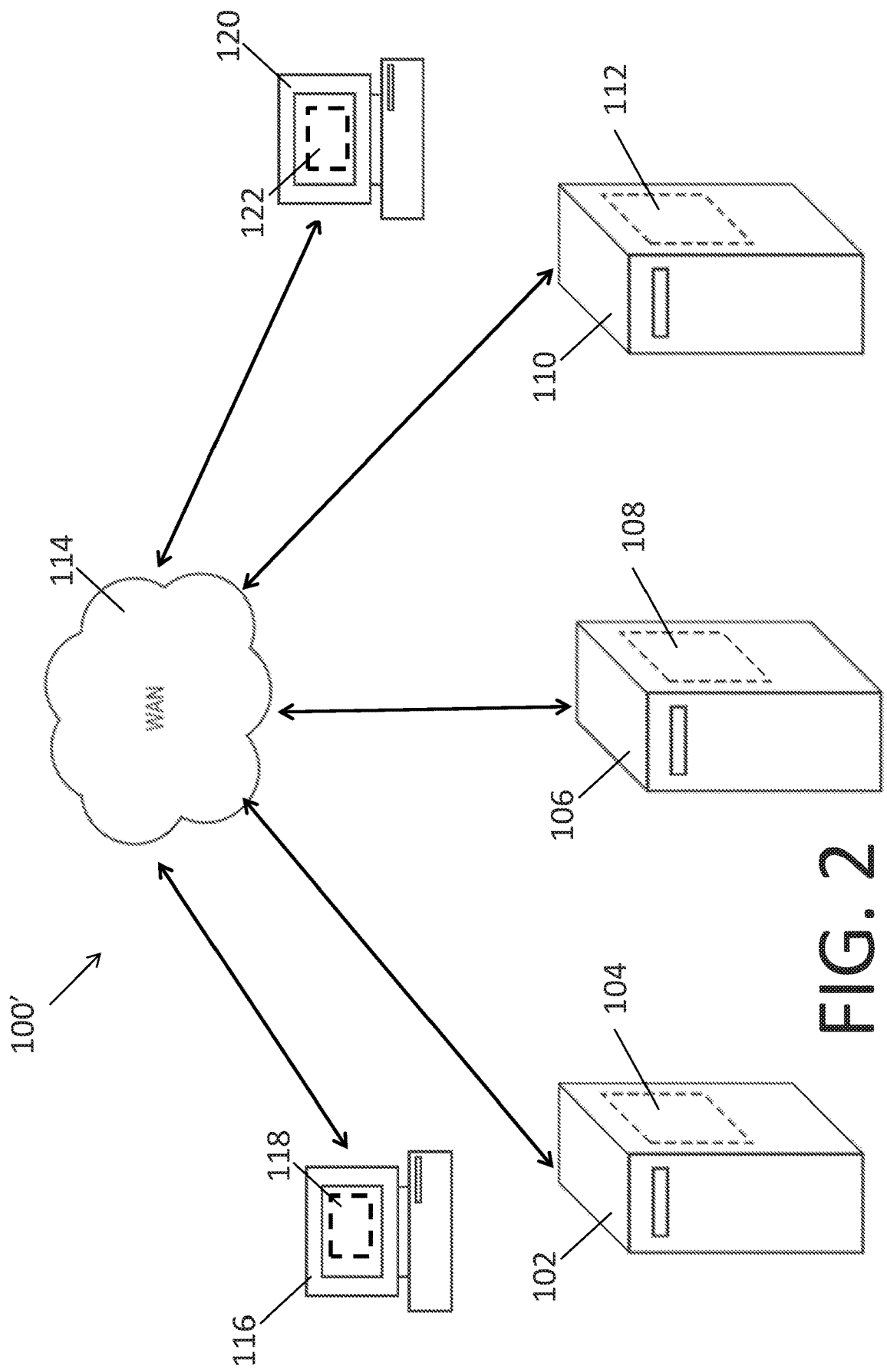

In other embodiments similar to those depicted in FIGS. 1 and 2, each of the network 114 or networks 114-1, 114-2, 114-3, 114-4 may be two or more networks depending on the system configuration and communication protocols employed. One or more or all of networks 114, 114-1, 114-2, 114-3, 114-4 may be, for example, a wireless or cellular network, a private communication network (e.g., mobile phone network), a Local Area Network (LAN), a Wide Area Network (WAN), and/or other technology capable of enabling one or more computing devices to communicate with one another. Reference to network 114, 114-1, 114-2, 114-3, 114-4 generally is not intended to refer to a specific network or communications protocol, and embodiments can be implemented using various networks 114, 114-1, 114-2, 114-3, 114-4 and combinations thereof.

While the service consumer/provider matching system 100 depicted in FIG. 1 includes one consumer/provider matching computer 106, one service consumer program host computer 102, and one service provider program host computer 110, each of these host (or server) computers 106, 102, 110, may be more than one operatively coupled server computers with a load balancer to manage larger amounts of traffic to the various programs (i.e., consumer/provider matching program 108, consumer program 104, and provider program 112) respectively running thereon. These programs can also operate on distributed computing and cloud environments. On the other hand, in other embodiments of service consumer/provider matching system 100", 100'" depicted in FIGS. 3 and 4, the consumer/provider matching program 108, the consumer program 104, and the provider program 112 are all hosted on a single server 106.

Figure 3:
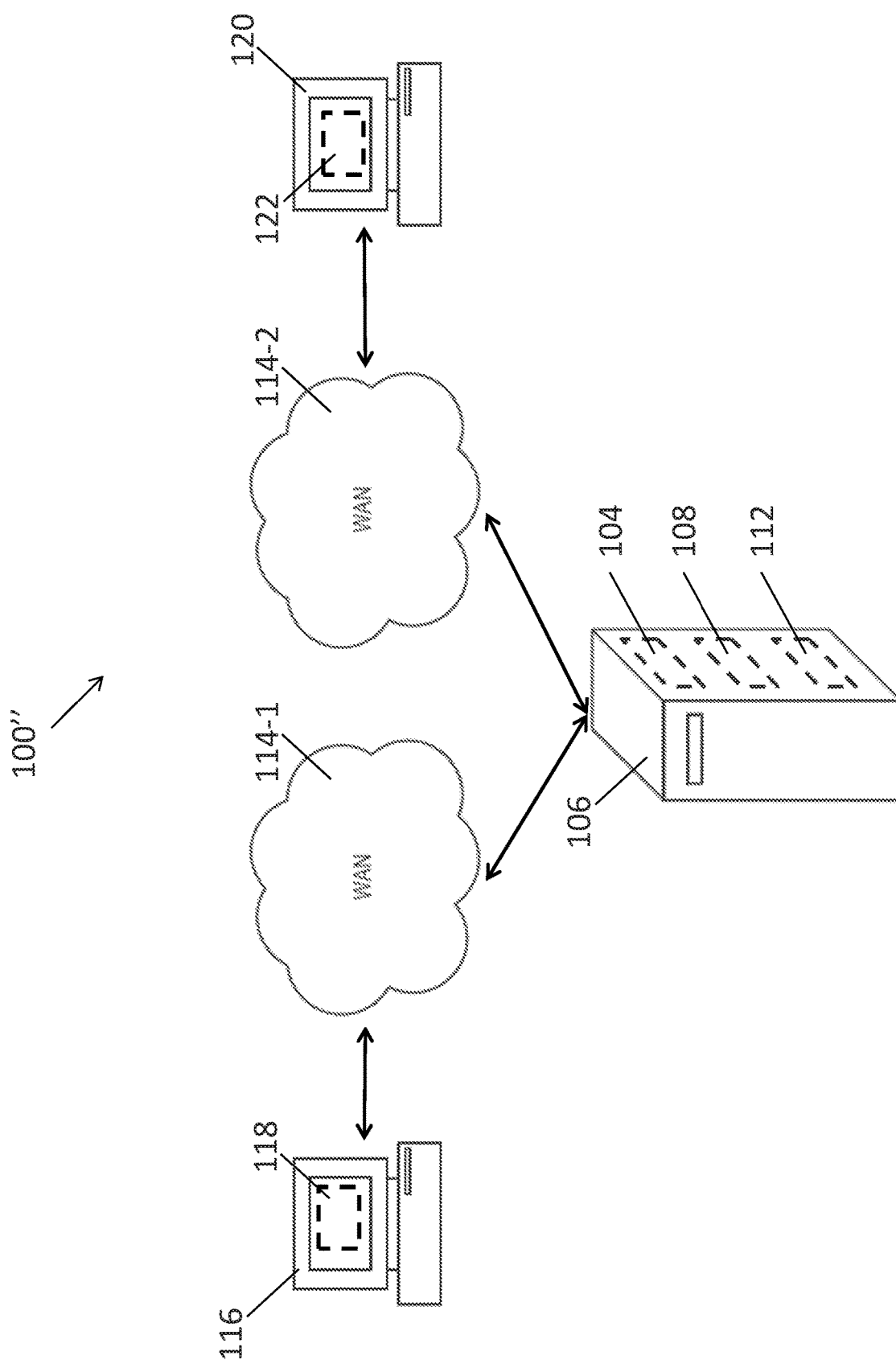
Figure 4:
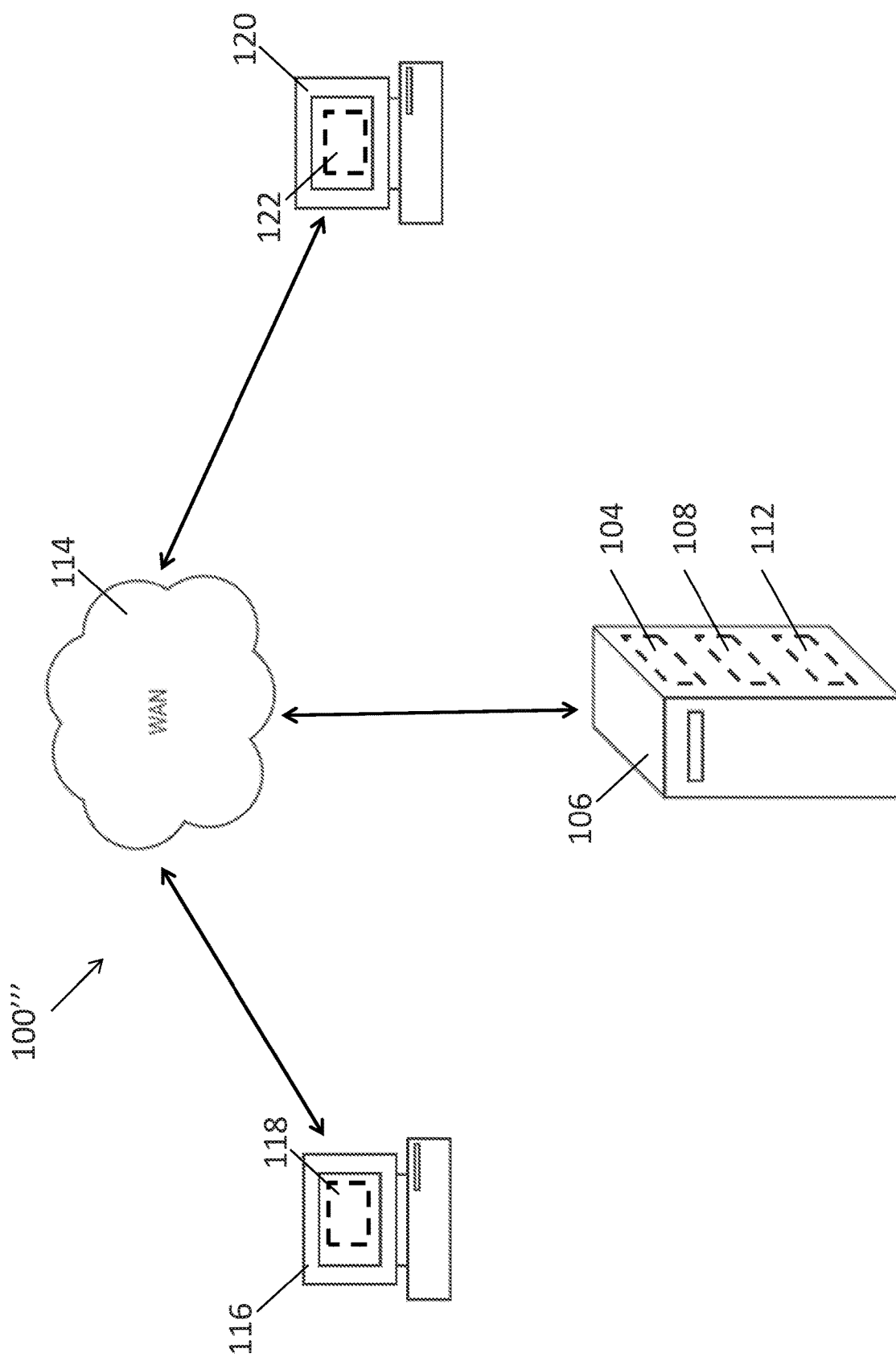

The service consumer/provider matching systems 100", 100'" depicted in FIGS. 3 and 4 are different in the number of networks communicatively coupling the consumer computer 116 and the provider computer 120 to the server 106. In the service consumer/provider matching system 100" depicted in FIG. 3, first and second networks 114-1, 114-2 communicatively and respectively couple the consumer computer 116 and the provider computer 120 to the server 106. In the service consumer/provider matching system 100'" depicted in FIG. 4, a single network 114 communicatively couples the consumer computer 116 and the provider computer 120 to the server 106.

While the consumer computers 116 and provider computers 120 depicted in FIGS. 1 to 4 are represented by stationary desktop computers, the consumer and provider computers may be stationary or desktop computers, or mobile computers, such as laptop computers, tablet computers and smartphones. Generally, user computing devices include a few common attributes (e.g., a processor, a memory, and the ability to communicate via network; see FIG. 5) housed in various form factors (e.g., desktop computer, laptop computer, tablet computer, smartphone, watch, or other computing devices comprising a processor, memory, and the ability to communicate with other computing devices via a network). The consumer computers 116 and provider computers 120 depicted in FIGS. 1 to 4 may include visual displays or screens operatively coupled thereto. Through these visual displays or screens, respective consumers and providers may physically interface with the consumer computers 116 and provider computers 120 and the respective browsers 118, 122 operating thereon.

Returning to FIG. 1, the service consumer/provider matching system 100 allows the consumer to communicate with and access the service consumer program 104 through the third network 114-3 using the browser 118 running on the consumer computer 116. Further, the consumer can communicate with and access the consumer/provider matching program 108 using the browser 118 running on the consumer computer 116 through the first and third networks 114-1, 114-3 and the service consumer program host computer 102. Similarly, the service consumer/provider matching system 100 allows the provider to communicate with and access the service provider program 112 through the fourth network 114-4 using the browser 122 running on the provider computer 120. Further, the provider can communicate with and access the consumer/provider matching program 108 using the browser 122 running on the provider computer 120 through the second and fourth networks 114-2, 114-4 and the service provider program host computer 110.

In some embodiments, select features of the consumer/provider matching program 108 may be instantiated as features of the service customer and provider programs 104, 112, respectively accessible to the customer and the provider through their browsers 118, 122. In such embodiments, the service customer and provider programs 104, 112 may use respective plugin services to load respective plugins and configurations corresponding to respective features of the consumer/provider matching program 108.

In one embodiment, the service is an accounting service, the consumer is a taxpayer, and the provider is an accountant. In this embodiment, the service consumer program 104 is an accounting program 104, service provider program 112 is a professional accounting program 112, and the consumer/provider matching program 108 is a taxpayer/accountant matching program 108. Examples of accounting programs include MINT Financial Management Software and QUICKBOOKS. Examples of professional accounting programs include QUICKBOOKS FOR ACCOUNTANTS.

While the service consumer/provider matching systems 100, 100', 100", 100'" depicted in FIGS. 1 to 4 show consumer/provider matching computers 108 communicatively coupled to a service consumer program host computer 102, a service provider program host computer 110, a consumer computer 116, and a provider computer 120, the consumer/provider matching computers 108 in these embodiments may also be communicatively coupled to pluralities of service consumer program host computer 102, service provider program host computer 110, consumer computer 116, and provider computer 120 (not shown for clarity). Accordingly, the service consumer/provider matching systems 100, 100', 100", 100'" are able to match a plurality of consumers with a plurality of providers.

The consumer/provider matching computers 108, service consumer program host computers 102, service provider program host computers 110, consumer computers 116, and provider computers 120, which are communicatively coupled by networks 114, 114-1, 114-2, 114-3, 114-4 disclosed herein, are particular arrangements of computers that are technological improvements to increase the speed, accuracy, and usability of consumer/provider matching systems (e.g., 100, 100', 100", 100'").

Figure 5:
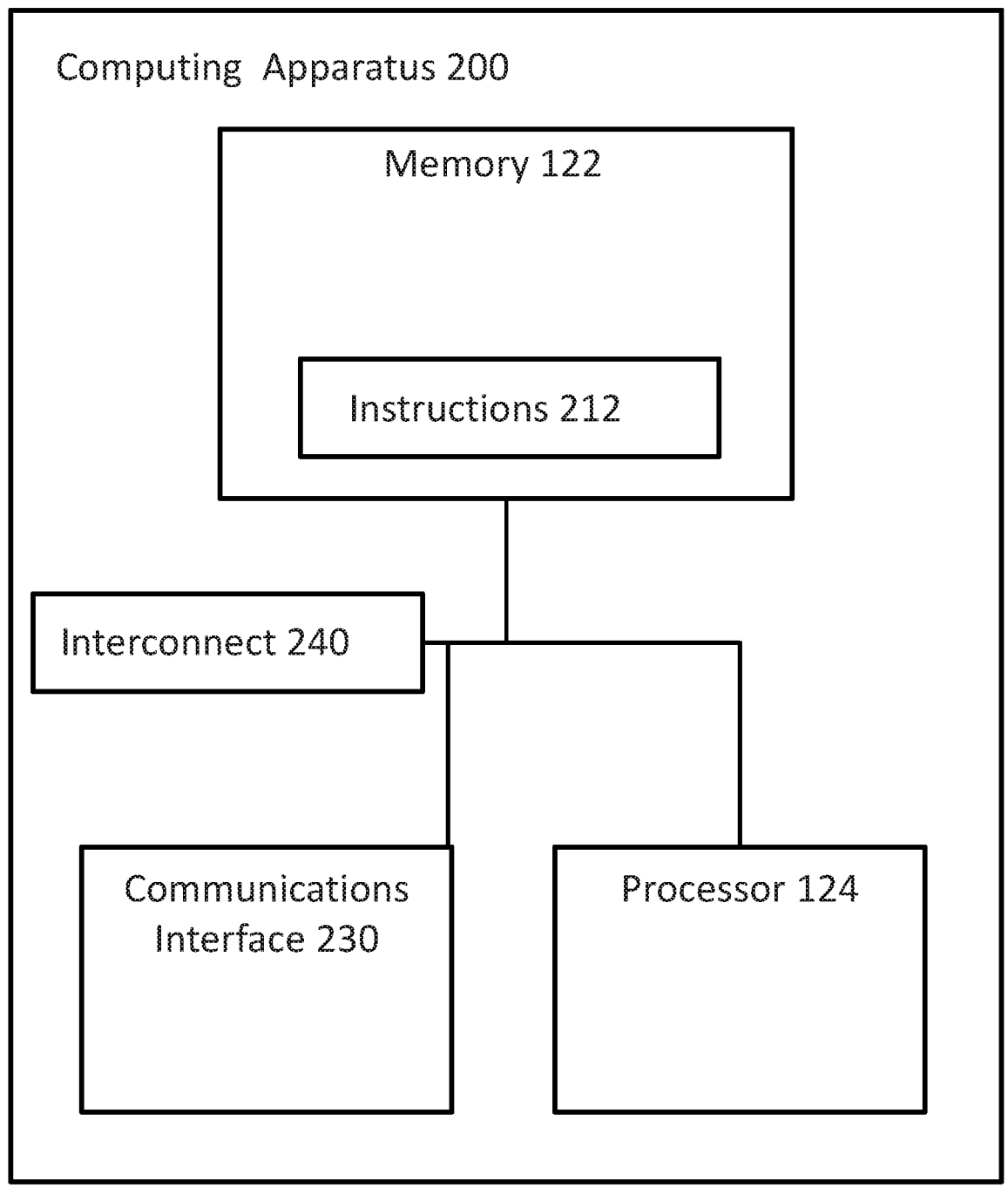
FIG. 5 is a block diagram of a computing apparatus or system in which various embodiments may be implemented or that may be utilized to execute various embodiments.

FIG. 5 generally illustrates certain components of a computing device 200 that may be utilized to execute embodiments and that includes a memory 122, program instructions 212, a processor or controller 124 to execute instructions 212, a network or communications interface 230, e.g., for communications with a network or interconnect 240 between such components. The memory 122 may be or include one or more of cache, RAM, ROM, SRAM, DRAM, RDRAM, EEPROM and other types of volatile or non-volatile memory capable of storing data. The processor unit 124 may be or include multiple processors, a single threaded processor, a multi-threaded processor, a multi-core processor, or other type of processor capable of processing data. Depending on the particular system component (e.g., whether the component is a computing device or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 5 is provided to generally illustrate how embodiments may be configured and implemented. The processors 124 in the consumer/provider matching computer 106, and the service consumer and provider program host computers 106, 110 are respectively programmed with the consumer/provider matching program 108, and the service customer and provider programs 104, 112 so that they are no longer generic computing devices.

Figure 6:
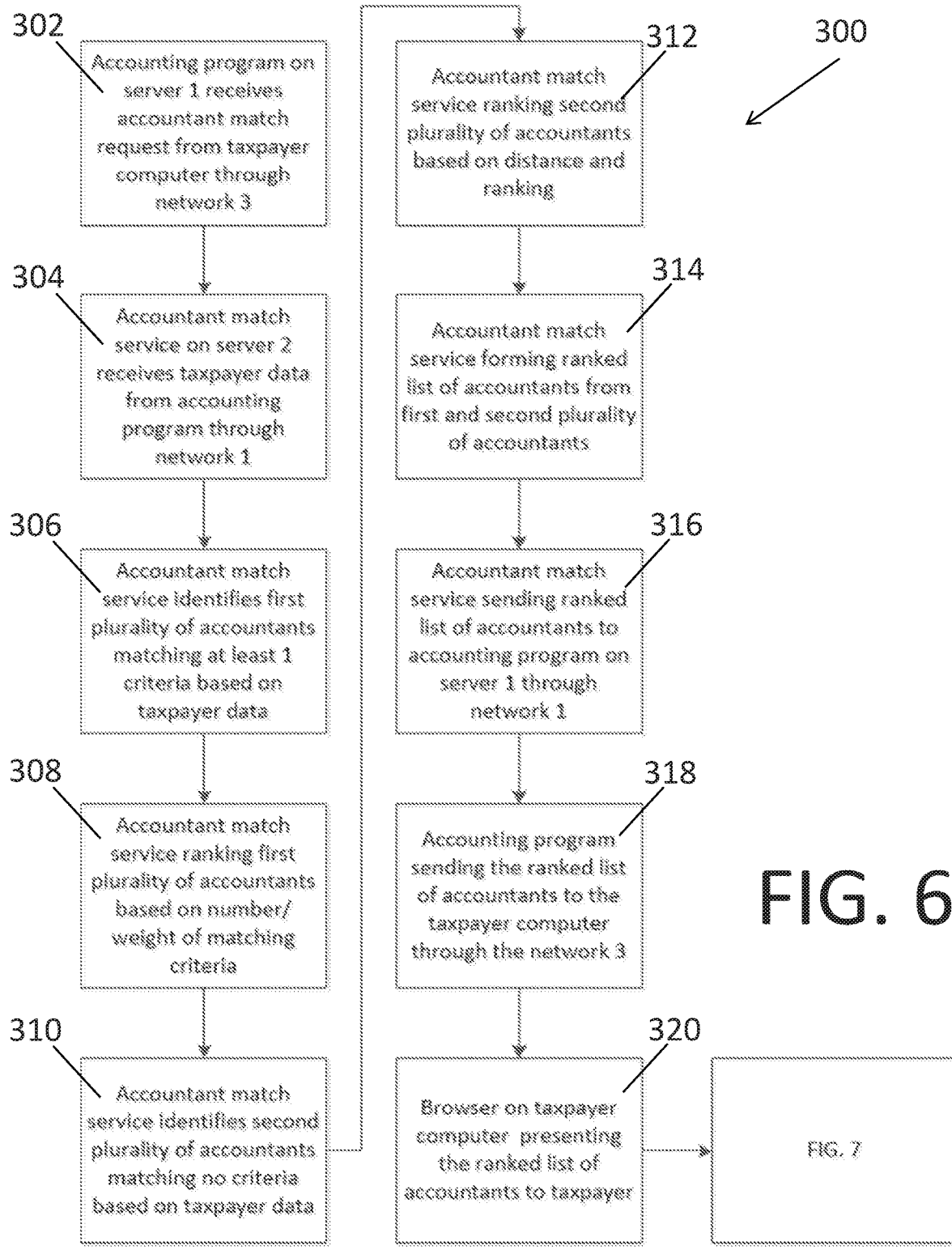
FIGS. 6 and 7 are two portions of a flowchart depicting a computer-implemented method/algorithm/rule set for matching service consumers and providers, according to one embodiment.
Figure 7:
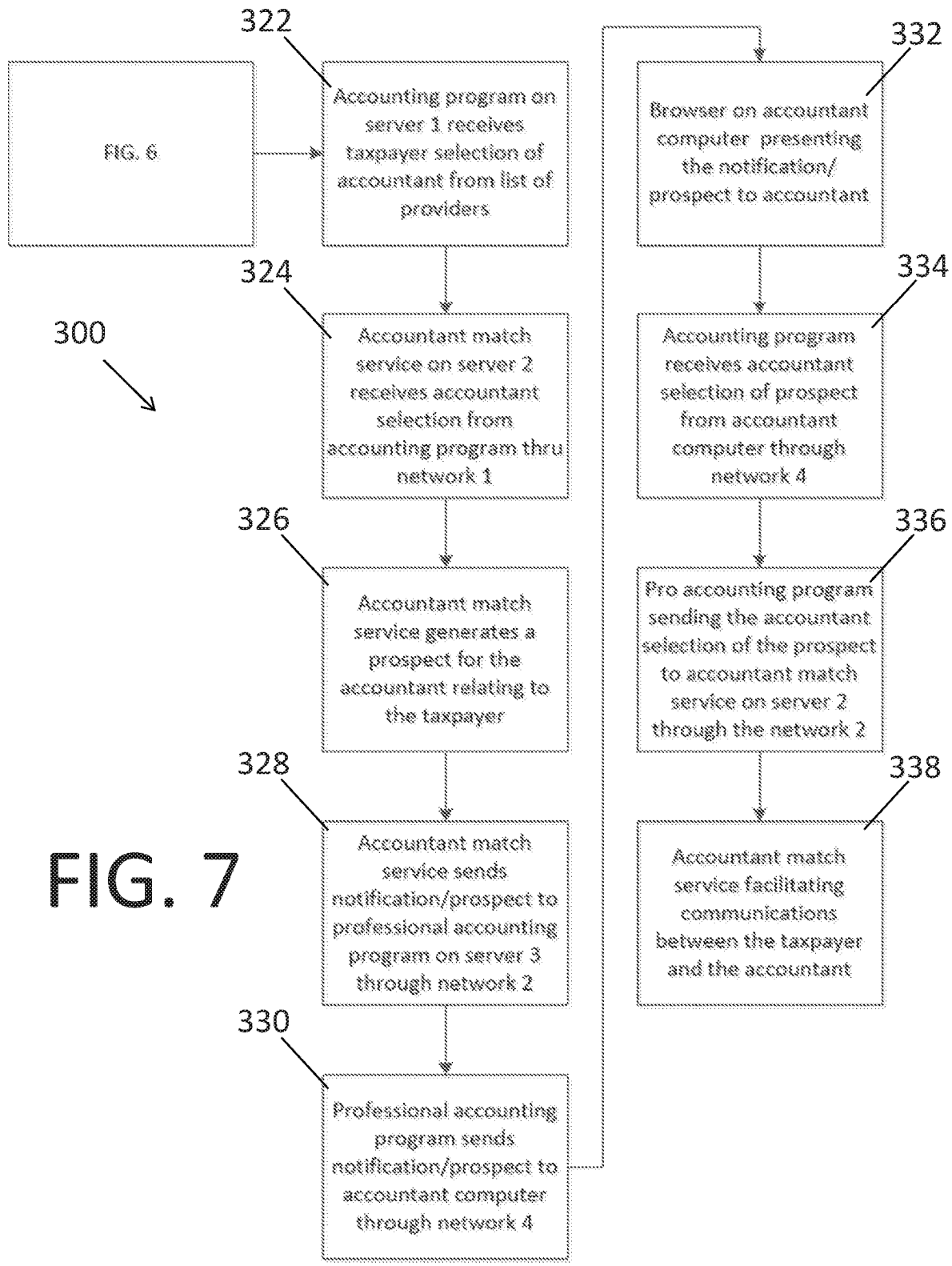

FIGS. 6 and 7 depict a method 300 for matching service consumers and service providers using the service consumer/provider matching system 100 depicted in FIG. 1. In the particular embodiment depicted in FIGS. 6 and 7, the consumers are taxpayers and the providers are accountants. FIGS. 8A-8K depict a series of accountant match user interfaces corresponding to the method 300 depicted in FIGS. 6 and 7. While FIGS. 6, 7, and 8A-8K depict an embodiment of the service consumer/provider matching system/method/rules where the service is accounting services, the consumers are taxpayers, and the providers are accountants, the methods and user interfaces depicted therein can be used to match various service consumers with service providers according to various embodiments. By analyzing consumer data (taxpayer data in the embodiment depicted in FIGS. 6, 7, and 8A-8K) and testing a plurality of service providers (accountants in the embodiment depicted in FIGS. 6, 7, and 8A-8K) against a set of criteria derived therefrom according to the rules described below, and using user interfaces like those depicted herein, this method 300 allows consumers/taxpayers to be matched with providers/accountants more efficiently, rapidly, accurately/successfully, and usably.

Figure 8A:
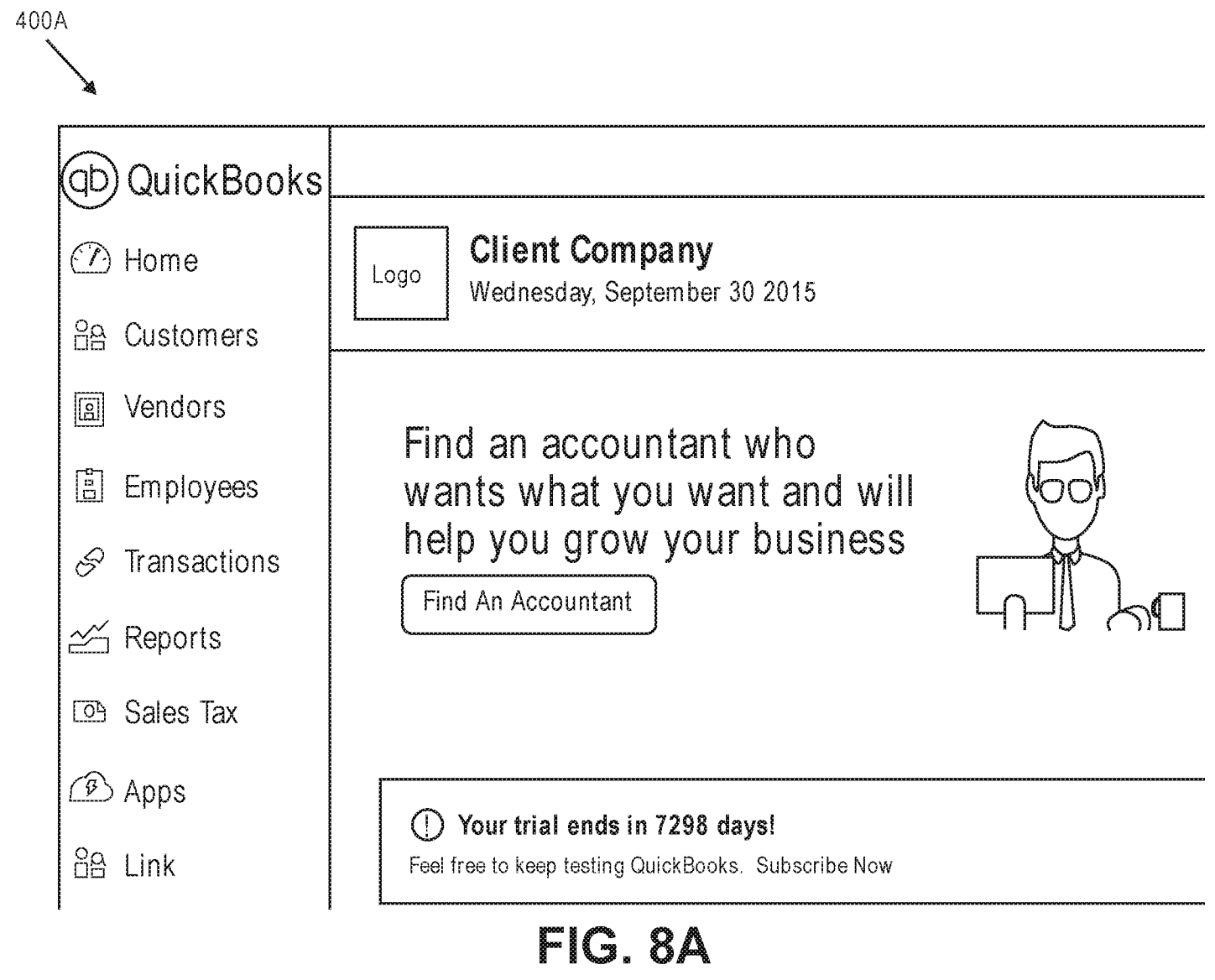

At step 302, an accounting program (i.e., service consumer program) 104 hosted on the accounting program host computer (i.e., service consumer program host computer) 102 receives an accountant match request from a taxpayer computer (i.e., consumer computer) 116 through the third network 114-3. For example, the taxpayer may select a user interface item 402 on a user interface 400A of the accounting program 104 displayed by the browser 118 on the consumer computer 116, as shown in FIG. 8A, to send the accountant match request to the accounting program 104. In particular, the taxpayer may request an accountant match service using a plugin instantiated as a feature of the accounting program 104 (e.g., QUICKBOOKS Online) accessed through a browser 118 hosted on the consumer computer 116.

At step 304, the service consumer/provider matching program 108 (e.g., an accountant match service/program) hosted on the consumer/provider matching computer 106 receives the taxpayer data from the accounting program 104 hosted on the accounting program host computer 102 through the first network 114-1. The accounting program 104 sends the taxpayer data to the service consumer/provider matching program 108 in response to receiving the accountant match requests in step 302. The taxpayer data may include data/financial records from the taxpayer's account in the accounting program 104.

At step 306, the service consumer/provider matching program 108 identifies a first plurality of accountants matching at least one criteria generated from an analysis of the taxpayer data. The consumer/provider matching computer 106 may derive the plurality of criteria from the consumer data by aggregating criteria from a pre-determined list of criteria present in the consumer data. The criterion may include an industry of the taxpayer, a legal entity status of the taxpayer, a frequency of data entry into a financial record of the taxpayer, an internal accuracy of data in the financial record, the taxpayer's use of the accounting software, a history of the taxpayer's use of the accounting software, a number of employees, a number of transactions, a number of customers, a number of vendors, an income amount, profit and loss data, a location of an employee, a location of a customer, a location of a vendor, and a degree of organization of the financial record. "Matching" one of these criteria includes, but is not limited to, the accountant having indicated their willingness, ability, and/or expertise to work with taxpayers matching that criterion. For instance, one accountant may match at least the following taxpayer criteria: in the restaurant industry; California partnerships; QUICKBOOKS users; fewer than 50 employees; and gross income less than $1 million per year.

The service consumer/provider matching program 108 may have access to provider data for all providers (e.g., accountants) participating in the service consumer/provider matching program 108. The provider data may be stored in a database (not shown) communicatively coupled to the consumer/provider matching computer 106. In one embodiment, where service providers are accountants, the provider data may have a data structure including the following fields:

an identifier corresponding to an accountant;
the accountant's name;
an industry code (e.g., NAICS code) corresponding to an industry supported by the accountant;
a list of customer ratings for the accountant;
an average review rating for the accountant;
GPS coordinates corresponding to a location of the accountant;
a state code corresponding to a state supported by the accountant;
a photograph of the accountant;
a text comment from the accountant;
a certification of the accountant; and
an identifier corresponding to a firm of the accountant.

In other embodiments, the criterion derived from the consumer data may include predicted data derived from the consumer data, and/or statistical data derived using the consumer data. The service consumer/provider matching program 108 may apply various statistical models (e.g., logistic regression, naive Bayes, K-means clustering, clustering, k-nearest neighbor). For instance, the service consumer/provider matching program 108 may predict that taxpayers in the restaurant industry in a certain zip code are likely to have annual gross income between one and two million dollars. The criterion may also include consumer style preferences. These can be derived from surveying or reviewing the other service providers that may have worked with the consumer in the past. Consumer style preferences include level of need, availability, number of questions, etc.

At step 308, the service consumer/provider matching program 108 ranks the first plurality of accountants based on a number of criteria that each accountant matches relative to the taxpayer. The service consumer/provider matching program 108 may rank the first plurality of providers by assigning a numerical value to each criterion of the one or more criteria met by each provider, and summing the numerical value(s) for the one or more criteria met by each provider. The service consumer/provider matching program 108 may also rank the first plurality of accountants based on a predetermined weighing of certain criteria. For instance, an accountant's expertise matching a taxpayers industry (e.g., identified using NAICS code) may receive two points, whereas an accountant's location being within a predetermined distance of a taxpayer's location may receive one point. The service consumer/provider matching program 108 may weigh certain criteria by modifying the numerical value assigned to a criterion by multiplying the numerical value by a pre-determined modifier value before summing the numerical value(s). The service consumer/provider matching program 108 may also weight certain criteria by assigning different pre-determined numerical values to some of the criteria before summing the numerical value(s). The service consumer/provider matching program 108 may also "learn" the preferences of a particular taxpayer or a group of taxpayers (e.g., in a certain areas, or all taxpayers using the accountant match system) over time. For instance, if taxpayers select an accountant in their zip code with a high frequency, the service consumer/provider matching program 108 may assign a zip code match a higher weight by increasing the pre-determined modifier value or numerical value.

In other embodiments, the service consumer/provider matching program 108 take into account in an accountant's expressed interest in or growth into a particular industry/field when ranking the first and second pluralities of accountants to override the basic ranking system.

At step 310, the service consumer/provider matching program 108 identifies a second plurality of accountants matching none of criteria generated from an analysis of the taxpayer data. Identifying and presenting accountants that match none of the criteria provides the service consumer/provider matching program 108 the flexibility to learn by identifying previously unknown criteria that may be important to taxpayers by performing statistical analyses on the final match data.

At step 312, the service consumer/provider matching program 108 ranks the second plurality of accountants based on the distance between the accountant and the taxpayer (i.e., between the GPS coordinates of the accountant's office and the GPS coordinates of the taxpayer's place of business or home) and an average customer rating for the accountant (e.g., 1 to 5 stars). In some embodiments, the customer rating may use a "reverse rating" system in which all accountants are initially assigned the perfect (e.g., five-star, 100%, etc.) rating. This system provides an opportunity for new accountants to the system to be visible in matches before they accumulate reviews or other feedback data. Instead of starting with the lowest rating, new accountants start with a perfect rating, and can only move to a lower rating with negative reviews.

In some embodiments, the rating total/average may also be rebalanced periodically (e.g., once a year) to allow improving accountants with old negative reviews improve their total/average rating. The rebalancing process evaluates the ratings of all accountants, and uses an average/median or other type of statistical evaluation to determine the most accurate "top rated", "mid rated", and "bottom rated" groupings. The process would then apply the new ratings values to all accountants within the groupings so that it is relative to peers. Rebalancing can bump some to full star ratings, and others to lower star ratings. In addition, recent positive reviews might be factored more heavily into the rebalancing to add additional value for accountants who have made huge improvements and now have higher number of positive reviews compared to negative reviews.

At step 314, the service consumer/provider matching program 108 generates a ranked list of accountants by appending the ranked second plurality of accountants to the end of the ranked first plurality of accountants. This method therefore inherently weighs matching criteria over other factors such as distance between the accountant and the taxpayer, and average customer rating.

At step 316, the service consumer/provider matching program 108 sends the generated ranked list of accountants to the accounting program 104 hosted on the service consumer program host computer 102 through the first network 114-1.

At step 318, the accounting program 104 sends the generated ranked list of accountants to the browser 118 on the consumer computer 116 through the third network 114-3.

Figure 8B:
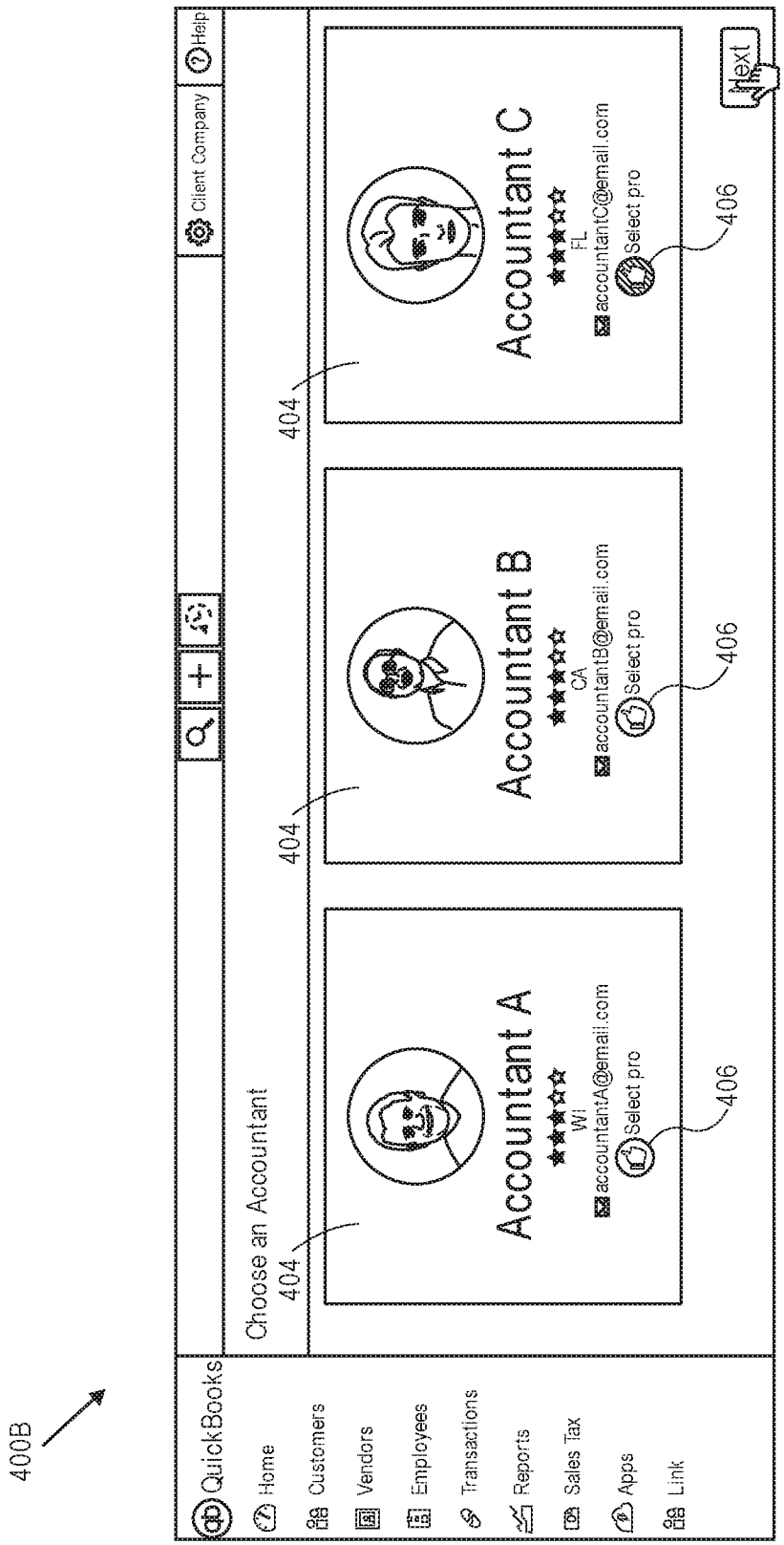
Figure 8C:
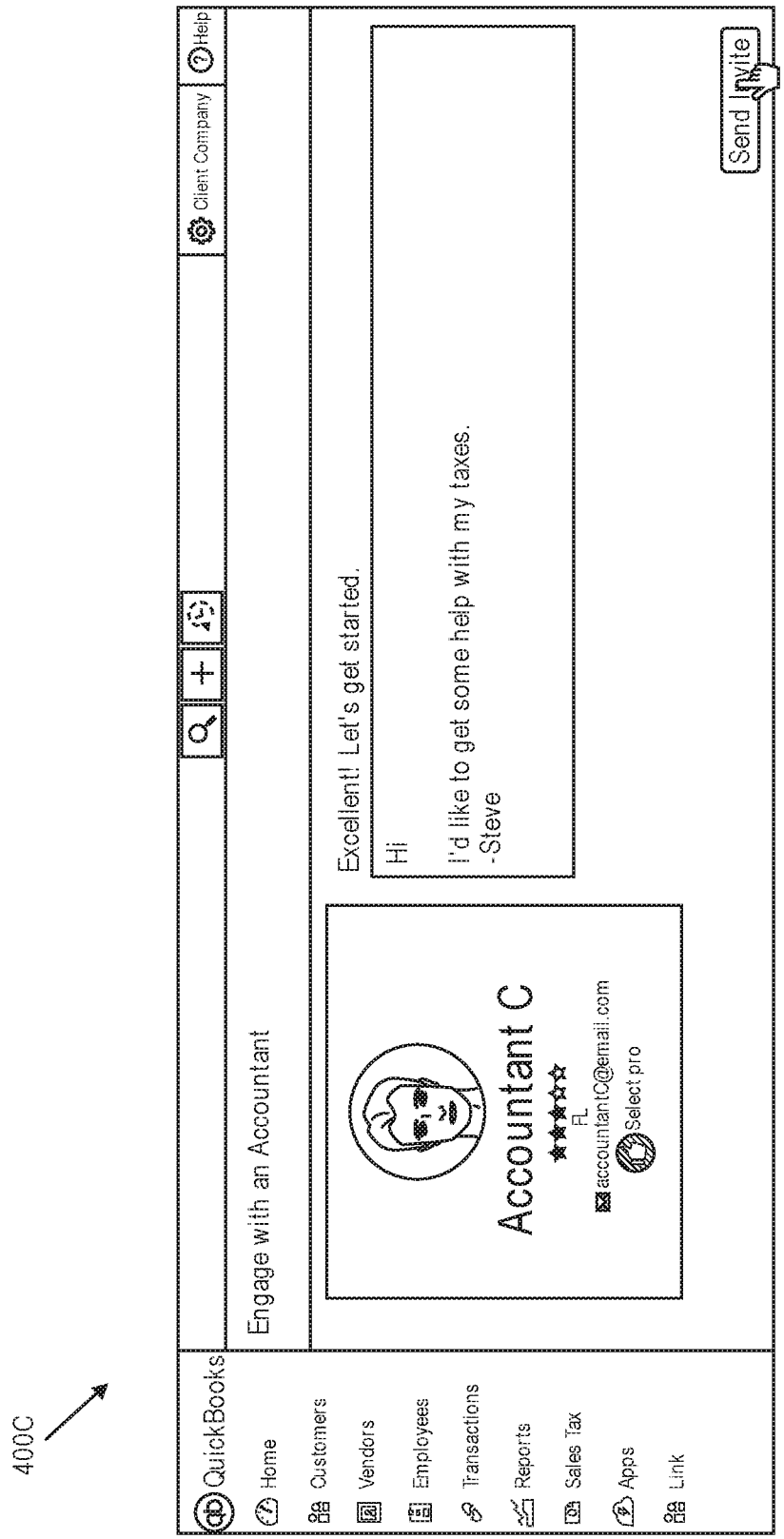
Figure 8D:
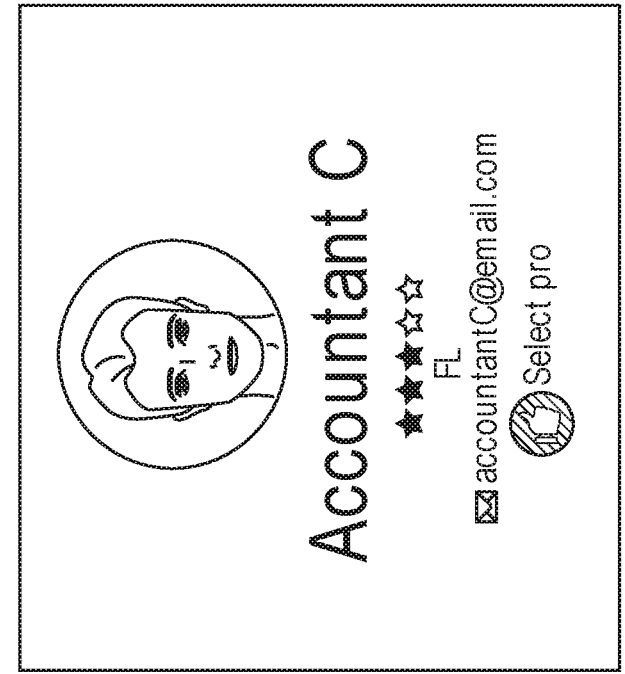
Figure 8E:
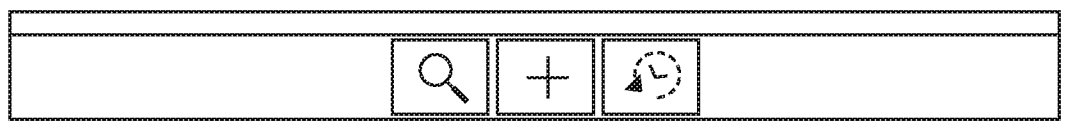

At step 320, the browser 118 hosted on the consumer computer 116 presents the ranked list of accountants to the taxpayer as shown in the user interface 400B in FIG. 8B. In the embodiment depicted in FIG. 8B, the browser 118/accounting program 104 present the ranked list of accountants to the taxpayer three accountants at a time from the top of the ranked list. Each accountant is represented by a user interface object 404 including some information about the accountant (i.e., picture, name, average customer rating, state of location, and e-mail address). Each user interface object 404 also includes a link 406 to select the accountant corresponding to the interface object 404.

At step 322, the accounting program 104 receives a taxpayer selection of an accountant from the ranked list of accountants. When the taxpayer clicks on a link 406 (see FIG. 8B), the taxpayer selects the accountant corresponding to the interface object 404 associated with the link 406. The browser 118 on the consumer computer 116 then sends the taxpayer selection of the accountant to the accounting program 104 on the service consumer program host computer 102.

At step 324, the service consumer/provider matching program 108 receives the accountant selection from the accounting program 104 through the first network 114-1. When the service consumer/provider matching program 108 receives the accountant selection, the service consumer/provider matching program 108 may cause the browser 118 on the consumer computer 116 to display a predetermined response message from the selected accountant as shown in user interfaces 400C and 400D in FIGS. 8C and 8D. the service consumer/provider matching program 108 may also cause the browser 118 on the consumer computer 116 to display a message informing the taxpayer that the system 100 has invited the accountant to collaborate with the taxpayer (as described below), as shown in user interface 400E in FIG. 8E. These predetermined response steps are not shown in FIGS. 6 and 7).

At step 326, the service consumer/provider matching program 108 generates a "prospect" for the selected accountant relating to the taxpayer. As used in this application, "prospect" includes, but is not limited to, an indication of a potential client for a service provider (e.g., accountant). In one embodiment, the prospect may have a data structure including the following fields:
an identifier corresponding to a prospect;
the prospect's name;
the prospect's phone number; and
the prospect's email address.

At step 328, the service consumer/provider matching program 108 sends a notification regarding the prospect to the professional accounting program (i.e. service provider program) 112 posted on the professional accounting program computer (i.e., service provider program host computer) 110 through the second network 114-2. The notification may include various taxpayer data and/or criteria relating to the taxpayer.

At step 330, the professional accounting program 112 (e.g., QUICKBOOKS FOR ACCOUNTANTS) sends the notification/prospect to the accountant computer (i.e., service provider computer) 120 through the fourth network 114-4.

At step 332, the browser 122 hosted on the provider computer 120 presents the notification/prospect to the accountant. The notification/prospect may be presented by itself or as part of a group (e.g., list) of notifications/prospects.

At step 334, the professional accounting program 112 receives a selection of a prospect by the accountant. For instance, an accountant may click on a link on a user interface to select a prospect (not shown). The browser 122 on the provider computer 120 then sends the accountant selection of the prospect to the professional accounting program 112 on the service provider program host computer 110 through the fourth network 114-4.

At step 336, the professional accounting program 112 sends the accountant selection of the prospect to the service consumer/provider matching program 108 through the second network 114-2.

At step 338, the service consumer/provider matching program 108 facilitates communications between the taxpayer and the accountant. The accountant match program 108 may facilitate communication between the consumer and the provider by sending consumer contact information to the provider, sending provider contact information to the consumer, scheduling an in-person meeting, scheduling a virtual meeting, and/or initiating an online chat.

Figure 8F:
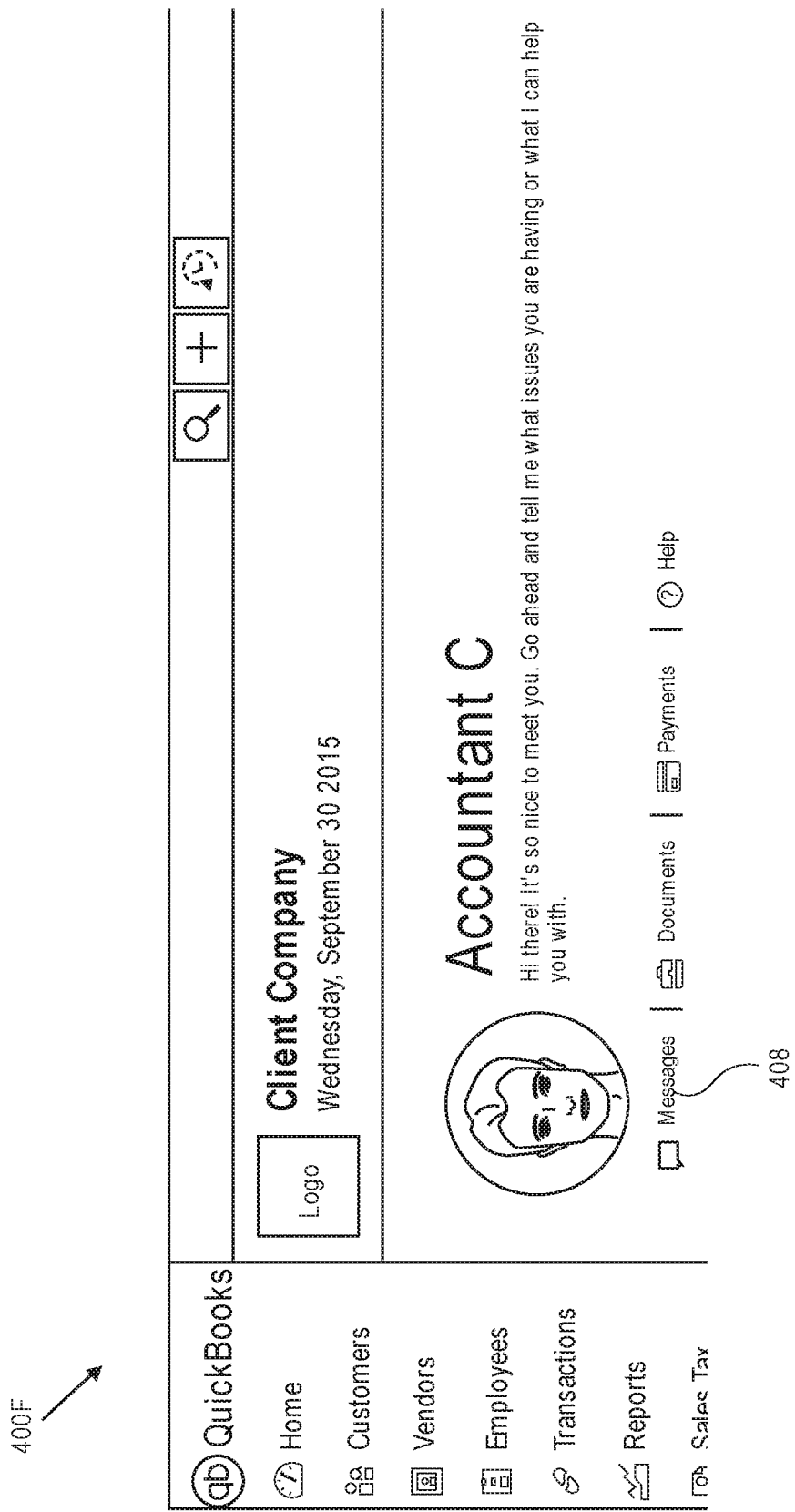

FIG. 8F depicts a user interface 400F displayed by the browser 118 on the consumer computer 116 after the selected accountant has selected the prospect corresponding to the taxpayer (see step 334). The user interface 400F includes a further welcome message and a link 408 that allows the taxpayer to initiate an online chat with the accountant.

Figure 8G:
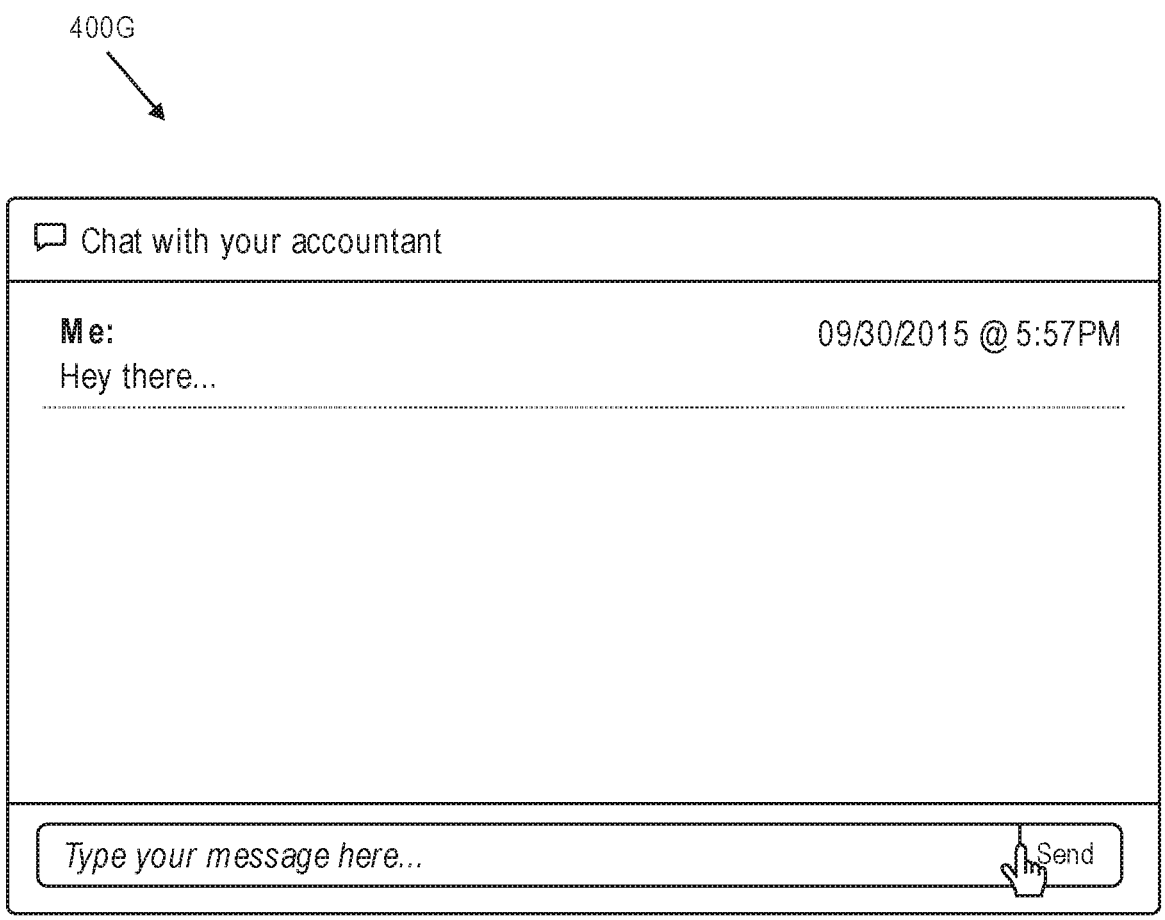

FIG. 8G depicts a chat user interface 400G displayed by the browser 118 on the consumer computer 116 after the taxpayer has selected the link 408 depicted in FIG. 8F.

Figure 8H:
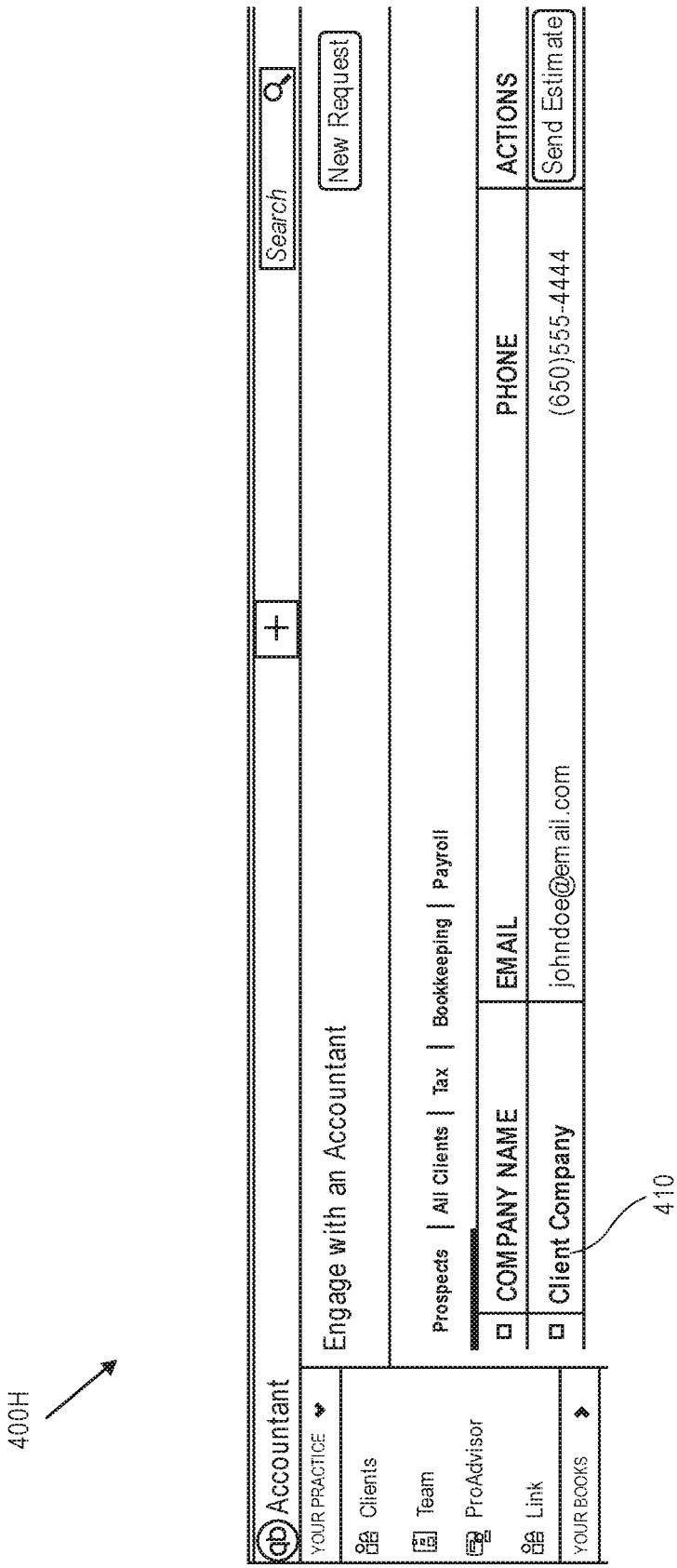

FIG. 8H depicts a user interface 400H displayed by the browser 122 on the provider computer 120. The user interface 400H lists the prospects of the accountant and allows for interaction with those prospects. For instance, by clicking on the prospect's name 410, the accountant can access more information relating to the prospect/taxpayer.

Figure 8I:
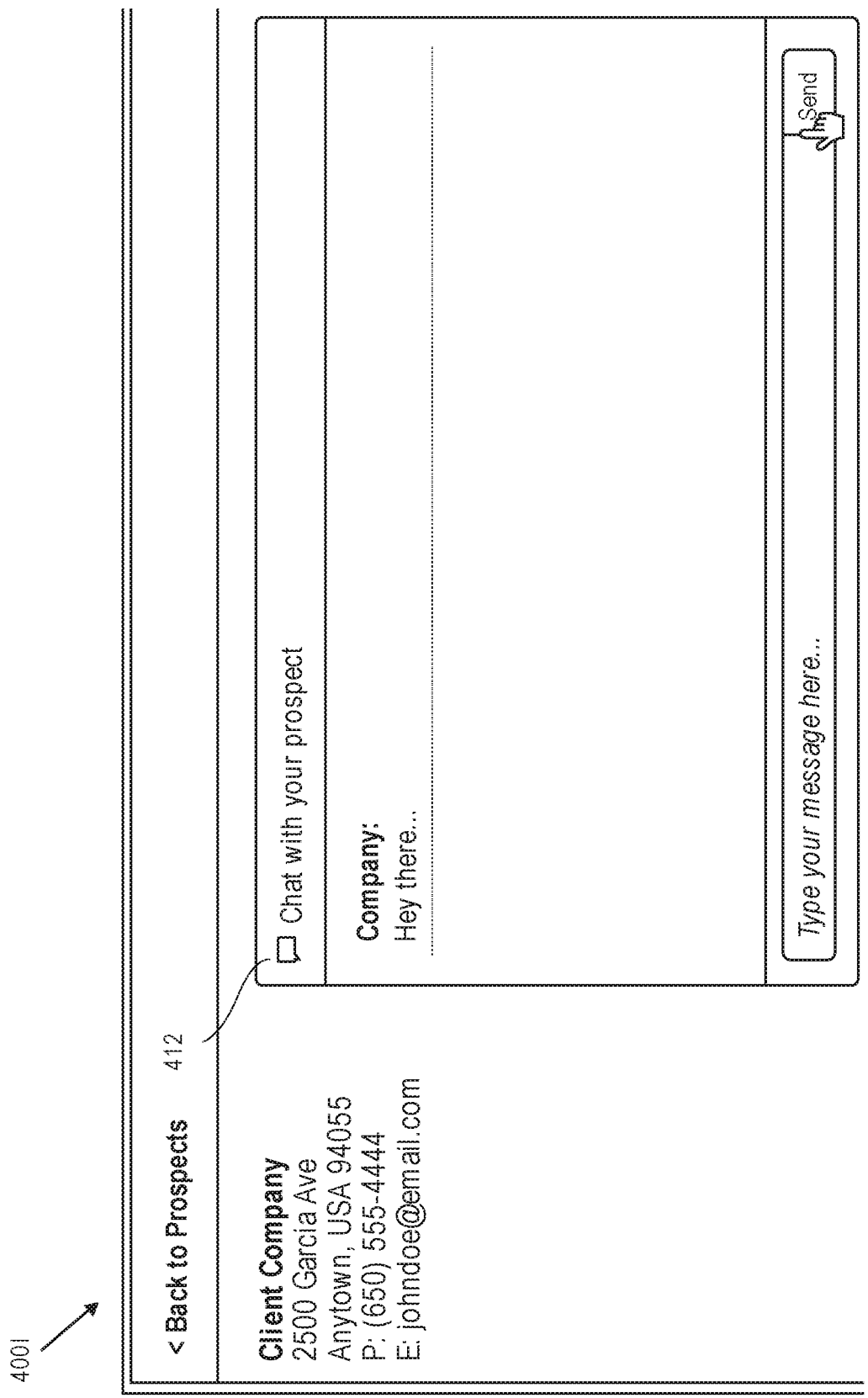

FIG. 8I depicts a user interface 400I displayed by the browser 122 on the provider computer 120 in response to selection of the prospects name 410 as shown in FIG. 8H. The user interface 400I includes information relating to the prospect/taxpayer (i.e., name, street address, phone number, e-mail address) and an online chat user interface window 412 to facilitate communication with the prospect/taxpayer.

Figure 8J:
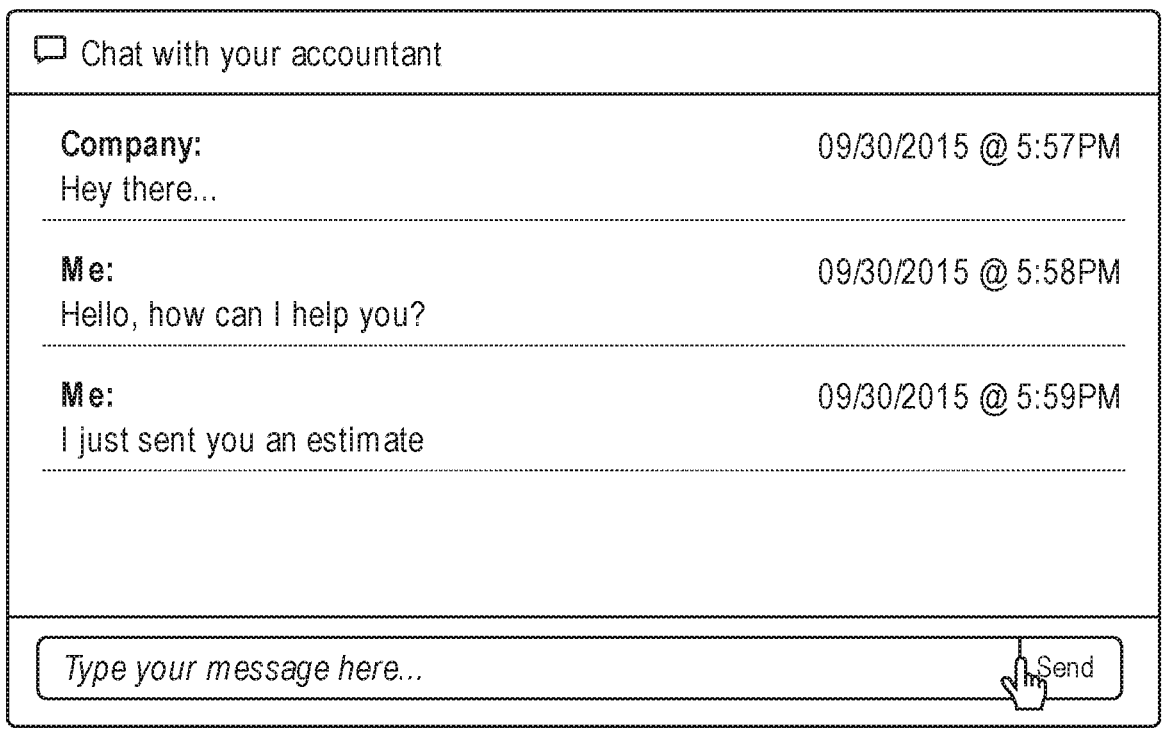

FIGS. 8J and 8K depict user interfaces 400J, 400K respectively displayed by the browsers 118, 122 on the taxpayer and accountant computers 116, 120 during an online chat between the accountant and the taxpayer to facilitate communication with the taxpayer.

The service consumer/provider matching system embodiments described herein efficiently, rapidly, accurately/successfully, and usably procure (by consumers) and furnish (by providers) services for a plurality of service consumers and service providers by following the rules described herein. Efficiently, rapidly, accurately/successfully, and usably procuring and furnishing services improves the user experience by saving service consumers time and effort during searching for service providers and saving service providers time and effort during searching for service consumers. The embodiments described herein also more accurately match service consumers and service providers, thereby saving both parties previously wasted money. The embodiments describe efficient systems and method for matching service consumers and providers having respective large diversities of service consumer needs and service provider expertise.

The embodiments also improve the efficiency of the computer systems (e.g., consumer/provider matching computer 106, service consumer program host computer 102, service provider program host computer 110) on which the service consumer/provider matching systems 100, 100', 100", 100''' operate, including processor load, memory footprint, and communication bandwidth. The use of consumer data based criteria to rank first and second pluralities of service provides, as described herein, increases processing efficiency and reduces memory footprint size and communication bandwidth. As such, the embodiments provide a technical solution to the technical problem of the processing cycles, memory, and communication bandwidth required to match service consumers and providers along a variety of axes, and difficulty achieving an accurate service consumer/provider match given the wide variety of factors to be considered. Increased system efficiency and accuracy is even more beneficial in view of the increasing amount of "big data" available for individuals, especially in systems that match large numbers of service consumers to large numbers of service providers. Overcoming these technical problems allows the consumers and providers to more efficiently, rapidly, accurately/successfully, and usably procure and furnish the services, respectively.

The embodiments described herein address the computer centric issue of facilitating communications between service consumers and providers over computer networks 114 using various computing engines that operate on various data structures. The embodiments described herein include transforming (1) consumer data into criteria, (2) criteria into ranked lists of accountants, and (3) service consumer into prospects. The embodiments described herein also improve the technical fields of information storage, information processing, and computer communications, including improved user interfaces.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 220 performs steps or executes program instructions 212 within memory 122 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

Although particular embodiments have been shown and described, it should be understood that the above discussion is not intended to limit the scope of these embodiments. While embodiments and variations of the many aspects of embodiments have been disclosed and described herein, such disclosure is provided for purposes of explanation and illustration only. Thus, various changes and modifications may be made without departing from the scope of the claims.

Where methods and steps described above indicate certain events occurring in certain order, those of ordinary skill in the art having the benefit of this disclosure would recognize that the ordering of certain steps may be modified and that such modifications are in accordance with the variations of the disclosed embodiments. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A system for matching a consumer of a service with a provider of the service, the system comprising:
   a service consumer program host computer communicatively coupled to a consumer/provider matching computer through a first network; and
   a service provider program host computer communicatively coupled to the consumer/provider matching computer through a second network,
   wherein when the service consumer program host computer receives a service provider match request, the service consumer program host computer sends consumer data corresponding to the consumer to the consumer/provider matching computer through the first network,
   wherein the consumer/provider matching computer:
      identifies a first plurality of providers, each of the first plurality of providers meeting at least one of a plurality of criteria derived from the consumer data,
      ranks the first plurality of providers based on one or more criteria from the plurality of criteria met by each provider of the first plurality of providers to generate a ranked first plurality of providers such that each criterion is assigned a numerical value that is aggregated when that criteria is met in order to rank the first plurality of providers;
      identifies a second plurality of providers, each of the second plurality of providers meeting none of the plurality of criteria derived from the consumer data,
      ranks the second plurality of providers based on a sum of respective geographical distances from the consumer and respective customer ratings to generate a ranked second plurality of providers,
      appends the ranked second plurality of providers to an end of the ranked first plurality of providers to generate a ranked list of providers, and
      displaying the ranked list of providers on a user interface of a user device associated with the consumer; and
      displaying a chat user interface on the user device to initiate an online chat between the consumer and at least one provider from the ranked list of providers.

2. The system of claim 1, wherein the consumer/provider matching computer derives the plurality of criteria from the consumer data by aggregating criteria from a pre-determined list of criteria present in the consumer data.

3. The system of claim 1, wherein the consumer/provider matching computer ranks the first plurality of providers by modifying a numerical value assigned to a criterion from the one or more criteria met by a provider by multiplying the numerical value by a pre-determined modifier value before summing the respective numerical values for the one or more criteria met by each provider of the first plurality of providers.

4. The system of claim 1, wherein each of the respective numerical values are equal to the others.

5. The system of claim 1, wherein the consumer/provider matching computer assigns different numerical values to at least two of the one or more criteria met by each provider of the first plurality of providers.

6. The system of claim 1, wherein the consumer/provider matching computer assigns the respective distance values by multiplying the respective geographical distances from the consumer of each provider of the second plurality of providers by a pre-determined distance modifier value.

7. The system of claim 1, wherein the consumer/provider matching computer assigns the respective ranking values by averaging the respective customer ratings of each provider of the second plurality of providers and multiplying by a pre-determined rating modifier value.

8. The system of claim 1, wherein the service provider program host computer sends provider data corresponding to a plurality of providers to the consumer/provider matching computer, the plurality of providers including the first and second pluralities of providers.

9. The system of claim 8, wherein the consumer/provider matching computer identifies the first plurality of providers by testing the providing data corresponding to each of the plurality of providers against corresponding criteria of the plurality of criteria derived from the consumer data.

10. The system of claim 1, wherein the plurality of criteria comprises an industry corresponding to the consumer.

11. The system of claim 1, wherein the respective customer ratings comprise customer ratings generated using a reverse ranking system.

12. The system of claim 1, further comprising:
   transmitting, by the service consumer program host computer, the ranked list of providers to a consumer computer through a third network;
   receiving, by the service consumer program host computer, a selection of a provider from the ranked list of providers via one or more of the first network and the third network;
   generating, by the service consumer program host computer, a prospect for the provider relating to the consumer;
   transmitting, by the service consumer program host computer, a notification regarding the prospect to a provider computer through a second network; and
   facilitating, by the service consumer program host computer, communication between the consumer and the provider.

13. The system of claim 12, wherein the consumer/provider matching computer facilitates communication between the consumer and the provider by sending consumer contact information to the provider, sending provider contact information to the consumer, scheduling an in-person meeting, scheduling a virtual meeting, or initiating an online chat.

14. The system of claim 12, wherein the notification regarding the prospect includes contact information for the consumer.

15. The system of claim 1, wherein the consumer/provider matching computer updates the ranked list of providers when the consumer/provider matching computer receives a subsequent service provider match request.

16. A computer-implemented method for matching a consumer of a service with a provider of the service, the method comprising:
   a service consumer program host computer receiving a service provider match request;
   the service consumer program host computer sending consumer data corresponding to the consumer to a consumer/provider matching computer through a first network in response to receiving the service provider match request;

the consumer/provider matching computer identifying a first plurality of providers, each of the first plurality of providers meeting at least one of a plurality of criteria derived from the consumer data;

the consumer/provider matching computer ranking the first plurality of providers based on one or more criteria from the plurality of criteria met by each provider of the first plurality of providers to generate a ranked first plurality of providers such that each criterion is assigned a numerical value that is aggregated when that criteria is met in order to rank the first plurality of providers;

the consumer/provider matching computer identifying a second plurality of providers, each of the second plurality of providers meeting none of the plurality of criteria derived from the consumer data;

the consumer/provider matching computer ranking the second plurality of providers based on a sum of respective geographical distances from the service consumer and respective customer ratings to generate a ranked second plurality of providers;

the consumer/provider matching computer appending the ranked second plurality of providers to an end of the ranked first plurality of providers to generate a ranked list of providers; and displaying the ranked list of providers on a user interface of a user device associated with the consumer; and displaying a chat user interface on the user device to initiate an online chat between the consumer and at least one provider from the ranked list of providers.

17. The method of claim 16, further comprising the consumer/provider matching computer deriving the plurality of criteria from the consumer data by aggregating criteria from a pre-determined list of criteria present in the consumer data.

18. The method of claim 16, further comprising the consumer/provider matching computer modifying a numerical value assigned to a criterion from the one or more criteria met by a provider by multiplying the numerical value by a pre-determined modifier value before summing the respective numerical values for the one or more criteria met by each provider of the first plurality of providers.

19. The method of claim 16, wherein each of the respective numerical values are equal to the others.

20. The method of claim 16, further comprising the consumer/provider matching computer assigning different numerical values to at least two of the one or more criteria met by each provider of the first plurality of providers.

21. The method of claim 16, further comprising the consumer/provider matching computer multiplying the respective geographical distances from the consumer of each provider of the second plurality of providers by a pre-determined distance modifier value to assign the respective distance values.

22. The method of claim 16, further comprising consumer/provider matching computer averaging the respective customer ratings of each provider of the second plurality of providers and multiplying by a pre-determined rating modifier value to assign the respective ranking values.

23. The method of claim 16, further comprising the service provider program host computer sending provider data corresponding to a plurality of providers to the consumer/provider matching computer, the plurality of providers including the first and second pluralities of providers.

24. The method of claim 23, further comprising consumer/provider matching computer identifying the first plurality of providers by testing the providing data corresponding to each of the plurality of providers against corresponding criteria of the plurality of criteria derived from the consumer data.

25. The method of claim 16, wherein the plurality of criteria comprises an industry corresponding to the consumer.

26. The method of claim 16, wherein the respective customer ratings comprises customer ratings generated using a reverse ranking method.

27. The method of claim 16, further comprising
the service consumer program host computer transmitting the ranked list of providers to a consumer computer through a third network;
the service consumer program host computer receiving a selection of a provider from the ranked list of providers via one or more of the first network and the third network;
the service consumer program host computer generating a prospect for the provider relating to the consumer;
the service consumer program host computer transmitting a notification regarding the prospect to a provider computer through a second network; and
the service consumer program host computer facilitating communication between the consumer and the provider.

28. The method of claim 27, wherein the consumer/provider matching computer facilitates communication between the consumer and the provider by sending consumer contact information to the provider, sending provider contact information to the consumer, scheduling an in-person meeting, scheduling a virtual meeting, or initiating an online chat.

29. The method of claim 27, wherein the notification regarding the prospect includes contact information for the consumer.

30. The method of claim 16, further comprising the consumer/provider matching computer updating the ranked list of providers when the consumer/provider matching computer receives a subsequent service provider match request.

31. A system, comprising:
a processor; and
memory having instructions stored thereon which, when executed by the processor, performs an operation for matching a consumer of a service with a provider of the service, the operation comprising:
receiving a service provider match request from a consumer and consumer data corresponding to the consumer;
identifying a first plurality of providers, each of the first plurality of providers meeting at least one of a plurality of criteria derived from the consumer data,
ranking the first plurality of providers based on one or more criteria from the plurality of criteria met by each provider of the first plurality of providers to generate a ranked first plurality of providers such that each criterion is assigned a numerical value that is aggregated when that criteria is met in order to rank the first plurality of providers,
identifying a second plurality of providers, each of the second plurality of providers meeting none of the plurality of criteria derived from the consumer data,
ranking the second plurality of providers based on a sum of respective geographical distances from the consumer and respective customer ratings to generate a ranked second plurality of providers, appending the ranked second plurality of providers to an end of the ranked first plurality of providers to generate a ranked list of providers, displaying the ranked list of providers on a user interface of a user device associated with the consumer; and displaying a chat user interface on the user device to initiate an online chat between the consumer and at least one provider from the ranked list of providers.

32. The system of claim 31, the operation further comprising deriving the plurality of criteria from the consumer data by aggregating criteria from a pre-determined list of criteria present in the consumer data.

33. The system of claim 31, the operation further comprising modifying a numerical value assigned to a criterion from the one or more criteria met by a provider by multiplying the numerical value by a pre-determined modifier value before summing the respective numerical values for the one or more criteria met by each provider of the first plurality of providers.

34. The system of claim 31, wherein each of the respective numerical values are equal to the others.

35. The system of claim 31, the operation further comprising assigning different numerical values to at least two of the one or more criteria met by each provider of the first plurality of providers.

36. The system of claim 31, the operation further comprising multiplying the respective geographical distances from the consumer of each provider of the second plurality of providers by a pre-determined distance modifier value to assign the respective distance values.

37. The system of claim 31, the operation further comprising averaging the respective customer ratings of each provider of the second plurality of providers and multiplying by a pre-determined rating modifier value to assign the respective ranking values.

38. The system of claim 31, the operation further comprising receiving provider data corresponding to a plurality of providers, the plurality of providers including the first and second pluralities of providers.

39. The system of claim 38, the operation further comprising identifying the first plurality of providers by testing the providing data corresponding to each of the plurality of providers against corresponding criteria of the plurality of criteria derived from the consumer data.

40. The system of claim 31, wherein the plurality of criteria comprises an industry corresponding to the consumer.

41. The system of claim 31, wherein the respective customer ratings comprise customer ratings generated using a reverse ranking method.

42. The system of claim 31, wherein the service is an accounting service, the consumer is a taxpayer, and the provider is an accountant.

43. The system of claim 31, the operation further comprising:

generating a prospect for the provider relating to for the consumer;

sending a notification regarding the prospect to a provider; and facilitating communication between the consumer and the provider.

44. The system of claim 43, the operation further comprising facilitating communication between the consumer and the provider by sending consumer contact information to the provider, sending provider contact information to the consumer, scheduling an in-person meeting, scheduling a virtual meeting, or initiating an online chat.

45. The system of claim 43, wherein the notification regarding the prospect includes contact information for the consumer.

46. The system of claim 43, the operation further comprising updating the ranked list of providers when the consumer/provider matching computer receives a subsequent service provider match request.

* * * * *